United States Patent
Weber et al.

(10) Patent No.: US 7,186,447 B2
(45) Date of Patent: *Mar. 6, 2007

(54) MATRIX LIQUID CRYSTAL DISPLAY

(75) Inventors: Georg Weber, Erzhausen (DE);
Ludwig Pohl, Darmstadt (DE);
Reinhard Hittich, Modautal (DE);
Herbert Plach, Darmstadt (DE);
Bernhard Scheuble, Yokohama (JP);
Takamasa Oyama, Fukami-nishi (JP);
Bernhard Rieger, Münster-Altheim (DE); Hans Adolf Kurmeier, Seeheim-Jugenheim (DE); Ekkehard Bartmann, Erzhausen (DE)

(73) Assignee: Merck Patent GmbH, Darmstadt (DE)

( * ) Notice: Subject to any disclaimer, the term of this patent is extended or adjusted under 35 U.S.C. 154(b) by 76 days.

This patent is subject to a terminal disclaimer.

(21) Appl. No.: 11/081,707

(22) Filed: Mar. 17, 2005

(65) Prior Publication Data

US 2005/0196551 A1 Sep. 8, 2005

Related U.S. Application Data

(60) Division of application No. 10/384,442, filed on Mar. 10, 2003, now Pat. No. 6,905,740, which is a division of application No. 09/468,312, filed on Dec. 21, 1999, now Pat. No. 6,562,419, which is a continuation of application No. 08/460,862, filed on Jun. 5, 1995, now Pat. No. 6,004,479, which is a continuation of application No. 08/151,667, filed on Nov. 15, 1993, now Pat. No. 5,519,525, which is a continuation of application No. 07/818,208, filed on Jan. 8, 1992, now abandoned, which is a division of application No. 07/458,695, filed on Jan. 5, 1990, now Pat. No. 5,122,295.

(30) Foreign Application Priority Data

| Oct. 20, 1988 | (DE) | 38 35 730 |
| Mar. 15, 1989 | (DE) | 39 08 403 |
| Jul. 13, 1989 | (DE) | 39 23 044 |

(51) Int. Cl.
*C09K 19/30* (2006.01)
*C09K 19/52* (2006.01)

(52) U.S. Cl. .................. 428/1.1; 428/1.3; 252/299.01; 252/299.63

(58) Field of Classification Search .................. 428/1.1, 428/1.3; 252/299.61, 299.63, 299.66, 299.01
See application file for complete search history.

(56) References Cited

U.S. PATENT DOCUMENTS

| 5,122,295 | A | * | 6/1992 | Weber et al. | 252/299.01 |
| 5,378,395 | A | * | 1/1995 | Weber et al. | 252/299.63 |
| 5,519,525 | A | * | 5/1996 | Weber et al. | 349/182 |
| 6,004,479 | A | * | 12/1999 | Weber et al. | 252/299.63 |
| 6,562,419 | B1 | * | 5/2003 | Weber et al. | 428/1.1 |
| 6,905,740 | B2 | * | 6/2005 | Weber et al. | 428/1.1 |
| 7,033,654 | B2 | * | 4/2006 | Heckmeier et al. | 428/1.1 |

* cited by examiner

*Primary Examiner*—Shean C. Wu

(57) ABSTRACT

Described are matrix liquid crystal displays having two plane parallel support plates which together with a frame form a cell, integrated non-linear elements for switching individual picture elements on the support plates and a nematic liquid crystal mixture which is present in the cell and has a positive dielectric anisotropy and high resistivity. The liquid crystal mixture has a nematic phase range of at least 60° C., a maximum viscosity at 20° C. of 30 mPa·s and a mean dielectricity constant $\epsilon \leq 8$. The liquid crystal mixture contains: a) at least 10% by weight of a liquid-crystalline component B having one or more compounds of the following formulae:

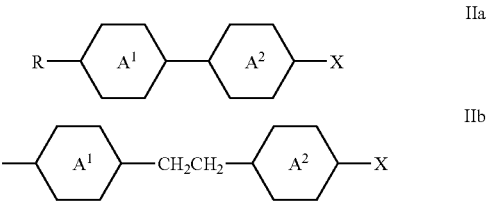

and b) up to 90% by weight of a liquid-crystalline component A having one or more compounds with a dielectric anisotropy of −1.5 to 1.5 of the formula I:

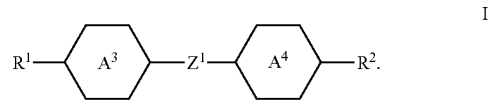

15 Claims, No Drawings

MATRIX LIQUID CRYSTAL DISPLAY

This application is a divisional of U.S. application Ser. No. 10/384,442, filed Mar. 10, 2003, now U.S. Pat. No. 6,905,740, which is a divisional of U.S. application Ser. No. 09/468,312, filed Dec. 21, 1999, now U.S. Pat. No. 6,562,419, which in turn is a continuation of U.S. application Ser. No. 08/460,862, filed Jun. 5, 1995, now U.S. Pat. No. 6,004,479, which in turn is a continuation of U.S. application Ser. No. 08/151,667, filed Nov. 15, 1993, now U.S. Pat. No. 5,519,525, which in turn is a continuation of U.S. application Ser. No. 07/818,208, filed Jan. 8, 1992, now abandoned, which in turn is a divisional of U.S. application Ser. No. 07/458,695, filed Jan. 5, 1990, now U.S. Pat. No. 5,122,295, which was the National Stage of International Application No. PCT/EP89/01226, filed Oct. 17, 1989.

The invention relates to a matrix liquid crystal display containing two plane parallel support plates which together with a frame form a cell, integrated non-linear elements for switching individual picture elements on the support plates and a nematic liquid crystal mixture which is present in the cell and has a positive dielectric anisotropy and high resistivity, the liquid crystal mixture being based on the following components:
a) at least 10% by weight of a liquid-crystalline component B comprising one or more compounds having a dielectric anisotropy of more than +1.5,
b) up to 90% by weight of a liquid-crystalline component A comprising one or more compounds having a dielectric anisotropy of −1.5 to +1.5 of the general formula I

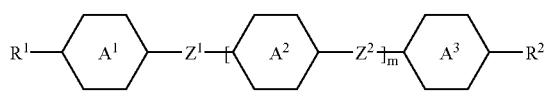

in which
$R^1$ and $R^2$ are each, independently of one another, n-alkyl, ω-fluoroalkyl or n-alkenyl having up to 9 carbon atoms,
the rings $A^1$, $A^2$ and $A^3$ are each, independently of one another, 1,4-phenylene, 2- or 3-fluoro-1,4-phenylene, trans-1,4-cyclohexylene or 1,4-cyclohexenylene,
$Z^1$ and $Z^2$ are each, independently of one another, —$CH_2CH_2$— or a single bond,
and
m is 0, 1 or 2, and
c) 0 to 20% by weight of a liquid-crystalline component C comprising one or more compounds having a dielectric anisotropy of less than −1.5, and the nematic liquid crystal mixture having a nematic phase range of at least 60° C., a maximum viscosity at 20° C. of 30 mPa·s and a mean dielectricity constant $\epsilon \leq 8$.

Matrix liquid crystal displays (MLC displays) according to the preamble are known. For example, active elements (i.e. transistors) can be used as non-linear elements for the individual switching of the individual picture elements. This is referred to as an "active matrix", in which two types can be distinguished:
1. MOS (metal oxide semiconductor) transistors on a silicon wafer as the substrate.
2. Thin film transistors (TFT) on a glass plate as the substrate.

In the case of type 1, dynamic scattering or the guest/host effect is usually used as the electrooptical effect. The use of single-crystal silicon as the substrate material limits the size of the display, since, even if different partial displays are put together in the form of modules, difficulties arise at the joints.

In the case of the more promising type 2, which is preferred, the TN effect is usually used as the electrooptical effect. Two-technologies are distinguished: TFTs consisting of compound semiconductors, such as, for example, CdSe, or TFTs based on polycrystalline or amorphous silicon. The latter technology is the subject of intense development work worldwide.

The TFT matrix is disposed on the inside surface of one of the glass plates of the display, while the other glass plate carries the transparent counter electrode on its inside surface. Compared with the size of the picture element electrode, the TFT is very small and essentially does not interfere with the picture. This technology can also be extended to picture displays in fully satisfactory colours by arranging a mosaic of red, green and blue filters in such a manner that each filter element is opposite to a switchable picture element.

The TFT displays usually operate as TN cells which contain crossed polarizers in transmission and are illuminated from behind.

The term MLC displays in this context comprises each matrix display which has integrated non-linear elements, i.e. apart from the active matrix also displays which contain passive elements such as varistors or diodes (MIM=metal/insulator/metal).

MLC displays of this type are in particular suitable for TV applications (e.g. portable TVs) or for highly informative displays in automobile and aircraft construction. In addition to problems regarding the angle dependency of the contrast and the switching times, difficulties in MLC displays arise from the insufficient resistivity of the liquid crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin-Film-Transistors for Matrix Addressing of Television Liquid Crystal Displays, p. 145 ff, Paris]. With decreasing resistivity, the contrast of an MLC display deteriorates. Since the resistivity of the liquid crystal mixture usually decreases by interaction with the inside surfaces of the displays over the lifetime of an MLC display, a high (initial) resistance is very important for achieving acceptable service lives.

Therefore, there is still a high demand for MLC displays which have very high resistivity in combination with a large range of operating temperatures, short switching times and low threshold voltage.

The object of the invention is to provide MLC displays which do not or only to a small extent have the above disadvantages and, at the same time, have very high resistivities.

It has now been found that this object can be achieved by using nematic liquid crystal mixtures in these display elements, which mixtures are based on the abovementioned components A, B and C, B and C, or B.

Accordingly, the invention relates to an MLC display containing two plane parallel support plates which together with a frame form a cell, integrated non-linear elements for switching individual picture elements on the support plates and a nematic liquid crystal mixture which is present in the cell and has a positive dielectric anisotropy and high resistivity, the liquid crystal mixture being based on the following components:

a) at least 10% by weight of a liquid-crystalline component B comprising one or more compounds having a dielectric anisotropy of more than +1.5, b) up to 90% by weight of a liquid-crystalline component A comprising one or more compounds having a dielectric anisotropy of −1.5 to +1.5 of the general formula I

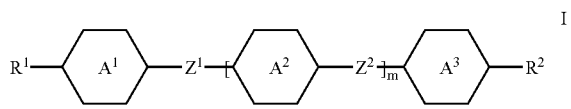

in which $R^1$ and $R^2$ are each, independently of one another, n-alkyl, ω-fluoroalkyl or n-alkenyl having up to 9 carbon atoms, the rings $A^1$, $A^2$ and $A^3$ are each, independently of one another, 1,4-phenylene, 2- or 3-fluoro-1,4-phenylene, trans-1,4-cyclohexylene or 1,4-cyclohexenylene, $Z^1$ and $Z^2$ are each, independently of one another, —CH$_2$CH$_2$— or a single bond, and m is 0, 1 or 2, and c) 0 to 20% by weight of a liquid-crystalline component C comprising one or more compounds having a dielectric anisotropy of less than −1.5, and the nematic liquid crystal mixture having a nematic phase range of at least 60° C., a maximum viscosity at 20° C. of 30 mPa·s and a mean dielectricity constant $\epsilon \leq 8$.

The invention also relates to the corresponding liquid crystal mixtures, in particular for use in MLC displays. However, the mixtures are also suitable for many other applications, such as, for example, TN, STN or OMI.

Nematic liquid crystal mixtures which instead of the compounds of the formula I contain analogous compounds in which one of the radicals $R^1$ and $R^2$ is n-alkyl and the other is n-alkoxy are known and commercially utilized in various designs. However, these liquid crystal mixtures are distinguished by values for the resistivity which are too low and are often between $5 \times 10^9$ and $1.1 \times 10^{11}$ Ωcm or less at 20°. The corresponding MLC displays have values for the resistivity which are too low for some commercial applications.

The resistivity of liquid crystal mixtures is in general high, if the dielectric anisotropy is small, since the polar components which are present in mixtures which have a high Δε have a stabilizing effect on ions and thus lead to high conductivity or low resistance. Surprisingly, it has now been-found that the resistivity is particularly high, if the mean dielectricity constant $\epsilon [=_3^1(2\epsilon_\perp+\epsilon_{11})]$ is small and, at the same time, the dielectrically neutral (Δε from −1.5 to +1.5) components of the liquid crystal mixture do not contain any functional groups such as, for example, aromatically bound alkoxy or ester functions. The dielectrically positive (Δε≧1.5) components usually carry terminal cyano groups. However, in the mixtures according to the invention, it is preferred to use, in addition to compounds which have a terminal cyano, also those which have a terminal —NCS, F, Cl, —CF$_3$—CHF$_2$, —OCF$_3$, —OCHF$_2$, —OCF$_2$CF$_2$H or —OC$_2$F$_5$.

However, component B can also substantially consist only of nitrile-containing compounds, of which those compounds of the formulae IIa to IIf where X is CN are preferred. In this case, the liquid crystal mixture essentially consists of components A, B and C, or A and B.

Particular preference is given to liquid crystal mixtures which contain nitrile-containing and nitrile-free, fluorinated compounds, the latter preferably conforming to the formulae IIa to IIf in which X is F, Cl, —CF$_3$, —CHF$_2$, —OCF$_3$, —OCHF$_2$, —OCF$_2$CF$_2$H or —OC$_2$F$_5$.

The ratio of nitrile-free to nitrile-containing compounds in component B is preferably >1:1, in particular >2:1. Particularly preferred ranges are 2.5:1 to 6:1.

However, very particular preference is given to liquid crystal mixtures whose component B essentially consists of nitrile-free, fluorinated compounds. Preferably, the above-mentioned preferred compounds of the formulae IIa to IIf are used.

'Essentially' is understood to mean that the amount of further compounds in the corresponding component is ≦20%, in particular ≦10%.

Preference is also given to liquid crystal mixtures whose component B contains compounds whose end groups are chlorinated. Compounds of this type are known to one skilled in the art and preferably conform to the formulae IIa to IIf where X is Cl. In a particularly preferred embodiment, the mixtures contain one or more compounds of the formula IIa to IIf in which $A^2$—X or $A^3$—X is

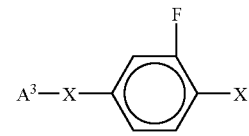

where X is CF$_3$—OCF$_3$, —OCHF$_2$ or Cl. Furthermore, component B can also contain tetranuclear compounds, for example in accordance with formulae IIc to IIf in which one of the rings $A^1$ to $A^3$ is present twice.

In a particularly preferred embodiment, the mixtures contain compounds which have a terminal nitrile and are present in component B in an amount from 0 to 50% by weight. Particular preference is given to mixtures which do not contain any compounds which have a terminal nitrile. Surprisingly, it has been found that groups such as —OCF$_3$, —OCHF$_2$—, —OCF$_2$CF$_2$H or —OC$_2$F$_5$ have a considerably less stabilizing effect in the displays than —OCH$_3$, or —OC$_2$H$_3$. The same is true for aliphatically bound alkoxy (compounds of the formulae III and IV).

The mixtures according to the invention preferably have a resistivity of ≧$10^{12}$ Ω×cm, particularly preferably >$10^{13}$ Ω×cm, at 20°. The mean $\epsilon$ is preferably ≦7, in particular ≦5.

The values of dielectric anisotropy of the individual compounds of components A to C are determined at 20° by extrapolation from a polar mixture (containing 24% of p-trans-4-propylcyclohexylbenzonitrile, 36% of p-trans-4-pentylcyclohexylbenzonitrile, 25% of p-trans-4-heptylcyclohexylbenzonitrile and 15% of 4-cyano-4'-(trans-4-pentylcyclohexyl)biphenyl), if the compound to be determined contains a dipole along the longitudinal axis of the molecule, or from a neutral mixture (containing 22% of trans-1-p-ethylphenyl-4-propylcyclohexane, 20% of trans-1-p-methoxyphenyl-1-propylcyclohexane, 15% of trans-1-p-ethoxyphenyl-4-propylcyclohexane, 19% of 4-ethyl-4-(trans-4-propylcyclohexyl)biphenyl, 14% of 4-ethyl-4-(trans-4-pentylcyclohexyl)biphenyl, 5% of 4,4'-bis(trans-4-propylcyclohexyl)biphenyl and 5% of 4-(trans-4-pentylcyclohexyl)-4'-(trans-4-propylcyclohexyl)biphenyl) in the case of neutral compounds.

The liquid crystal mixtures according to the invention make it possible to achieve a high value for the resistivity in combination with low viscosities, which allows to produce excellent MLC displays. The MLC displays according to the invention preferably operate in the first transmission minimum according to Gooch and Tarry [C. H. Gooch and H. A. Tarry, Electron. Lett. 10, 2–4, 1974; C. H. Gooch and H. A. Tarry, Appl. Phys., Vol. 8, 1575–1584, 1975.], in which case in addition to particularly favourable electrooptical properties such as, for example, high steepness of the characteristic curve and low angle dependence of the contrast (German Patent Specification 3,022,818) in combination with the same threshold voltage as in an analogous display, a smaller dielectric anisotropy is sufficient in the second minimum. This makes it possible to achieve significantly higher resistivities in the first minimum, when the mixtures according to the invention are used.

The viscosity at 20° C. is preferably ≦25 mPa·s. The nematic phase range is preferably at least 70°, in particular at least 80°. Preferably, this range extends at least from −20° to +70°.

The individual compounds of the formulae I to IV and their subformulae which can be used in the MLC displays according to the invention are either known or can be prepared analogously to known compounds.

Preferred liquid crystal mixtures to be used according to the invention contain a total of, preferably, 10% to 90%, in particular 20% to 90%, of compounds of the formula I. If component B is not composed predominantly of strongly dielectrically positive nitrile components but predominantly only of weakly dielectrically positive compounds such as, for example, the fluorinated compounds mentioned below, component A can under certain circumstances be omitted entirely, and the mixtures according to the invention can in this special embodiment be solely based on component B and, if desired, component C. Particular preference is given to liquid crystal mixtures whose component B contains one or more compounds selected from the group consisting of compounds of the formulae IIa to IIf

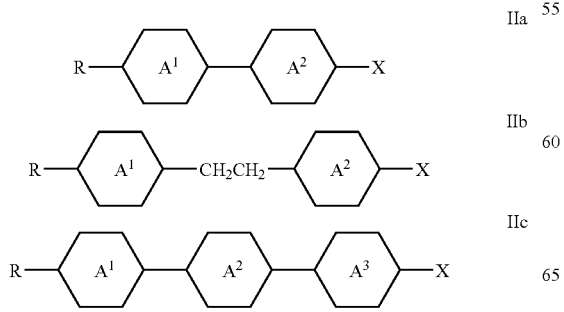

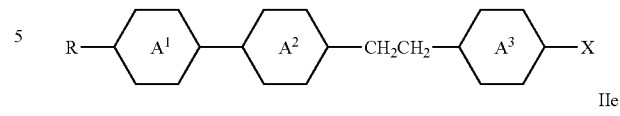

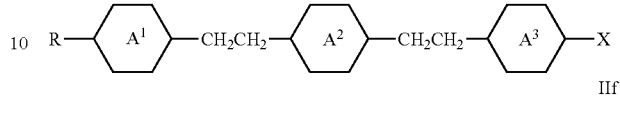

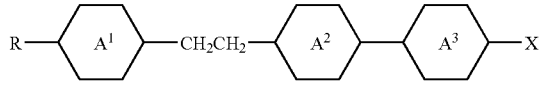

in which

R is n-alkyl or n-alkenyl of up to 9 carbon atoms,

X is cyano, —NCS, F, Cl, —CF$_3$, —CHF$_2$, —OCF$_3$, —OCHF$_2$, —OCF$_2$CF$_2$H or —OC$_2$F$_3$, and the rings A$^1$, A$^2$ and A$^3$: are each, independently of one another, 1,4-phenylene, 2- or 3-fluoro-1,4-phenylene, 2,3-difluoro-1,4-phenylene, trans-1,4-cyclohexylene or 1,4-cyclohexenylene.

Preferably, component B contains compounds of the formulae IIa to IIf in which X is cyano and compounds of the formulae IIa to IIf in which X is —NCS, F, Cl, —CF$_3$, —CHF$_2$, —OCF$_3$—OCHF$_2$, —OCF$_2$CF$_2$H or —OC$_2$F$_5$, and the amount of cyano compounds in component B is 0 to 50% by weight.

In a particularly preferred embodiment, component B does not contain any compounds of the formulae IIa to IIf in which X is cyano.

In the compounds of the partial formulae IIa to IIf, X is preferably F, Cl, CF$_3$, —OCF$_3$, —OCHF$_2$ or —CHF$_2$.

The rings A$^1$, A$^2$ and A$^3$ are each preferably, independently of one another, trans-1,4-cyclohexylene or 1,4-phenylene. In a preferred embodiment, one of the rings A$^1$, A$^2$ and A$^3$ is 2- or 3-fluoro-1,4-phenylene or 2,3-difluoro-1,4-phenylene. The ring bound to X (i.e. A$^2$ in IIa and IIb and A$^3$ in IIc to IIf) is preferably 1,4-phenylene which is unsubstituted or even mono- or di-substituted by fluorine. A$^2$—X and A$^3$—X are preferably a group selected from the formulae (a) to (h):

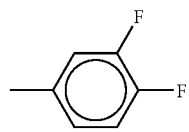

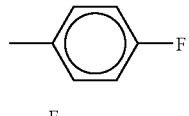

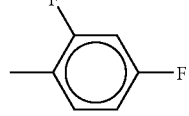

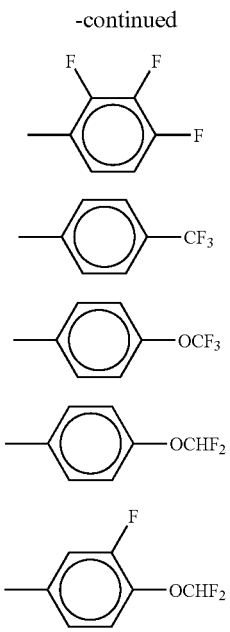

of which (a), (b), (d), (f), (g) and (h) are particularly preferred.

Particularly preferred smaller groups of compounds are listed below:

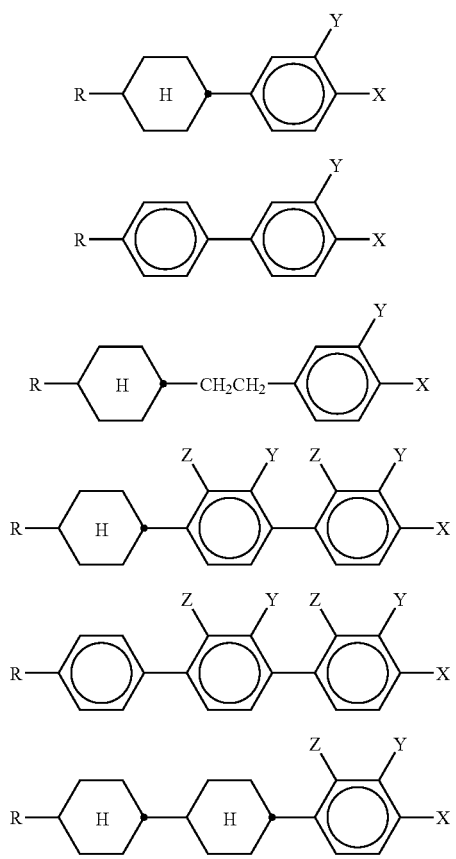

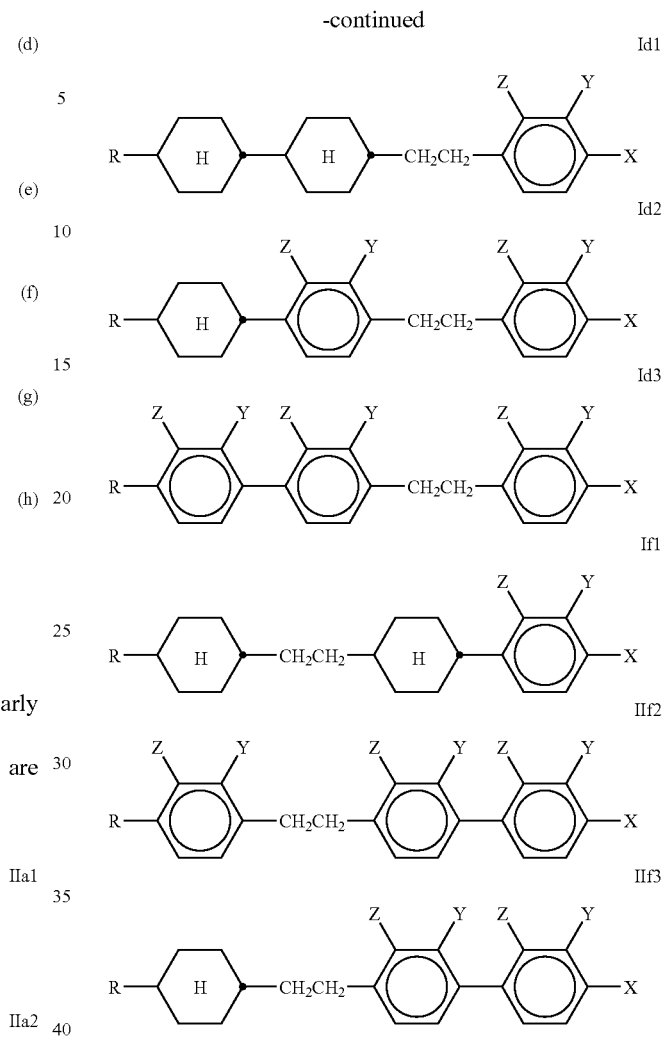

In the partial formulae IIa1 to IIf3, R is in each case n-alkyl or n-alkenyl of up to 9 carbon atoms) Y and Z are each, independently of one another; H or F although one or two of the radicals Y and Z is preferably fluorine. However, X is preferably F, Cl, —CF$_3$—, —OCF$_3$ or —OCHF$_2$.

Component B preferably represents 10% to 100%, in particular 20% to 80%, of the mixtures according to the invention.

Component A preferably contains one or more compounds selected from the group consisting of II1 to II7:

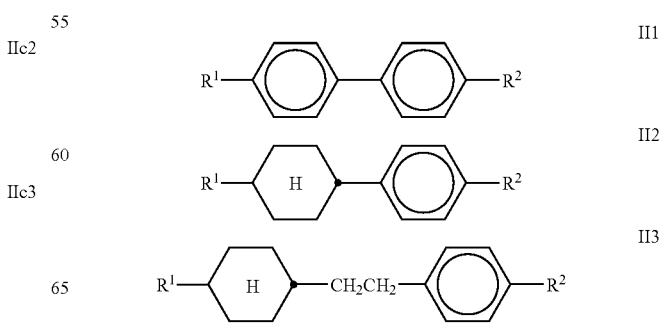

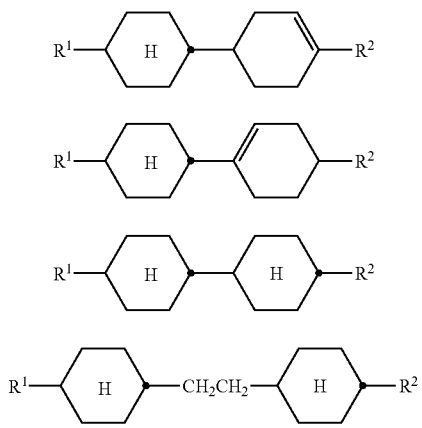

in which $R^1$ and $R^2$ have the meaning-given in claim 1.

Preferably, component A additionally contains one or more compounds selected from the group consisting of II8 to II20:

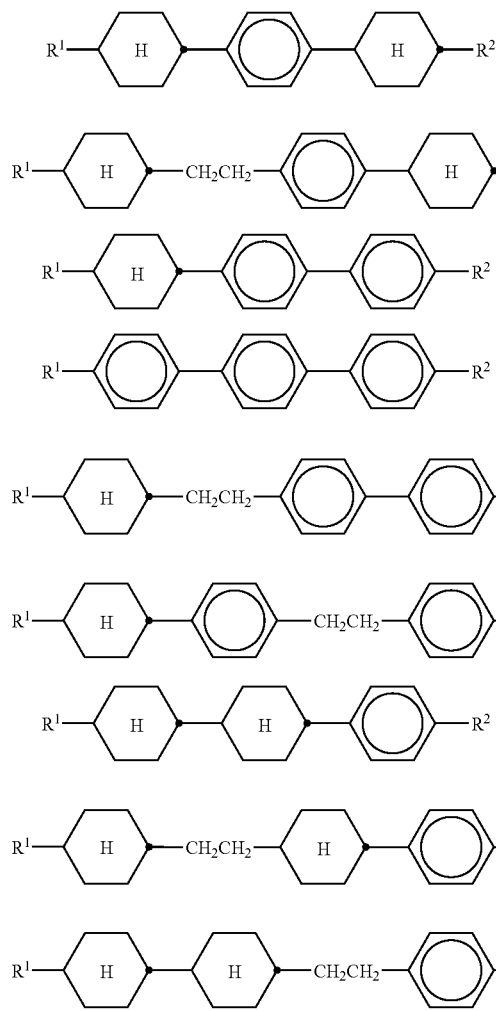

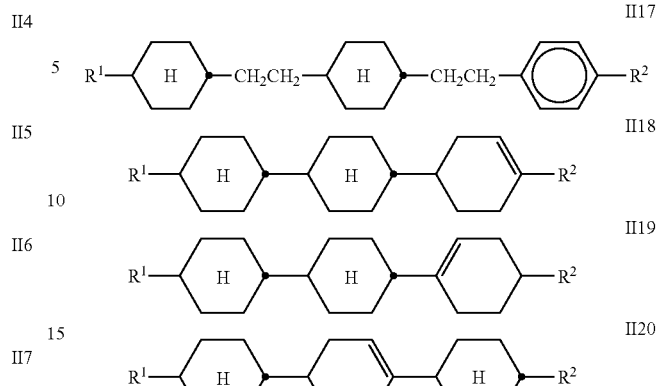

in which $R^1$ and $R^2$ have the meaning given in claim 1 and the 1,4-phenylene groups in II8 to II17 can each, independently of one another, also be mono- or polysubstituted by fluorine.

Furthermore, component A preferably additionally contains one or more compounds selected from the group consisting of II21 to II25:

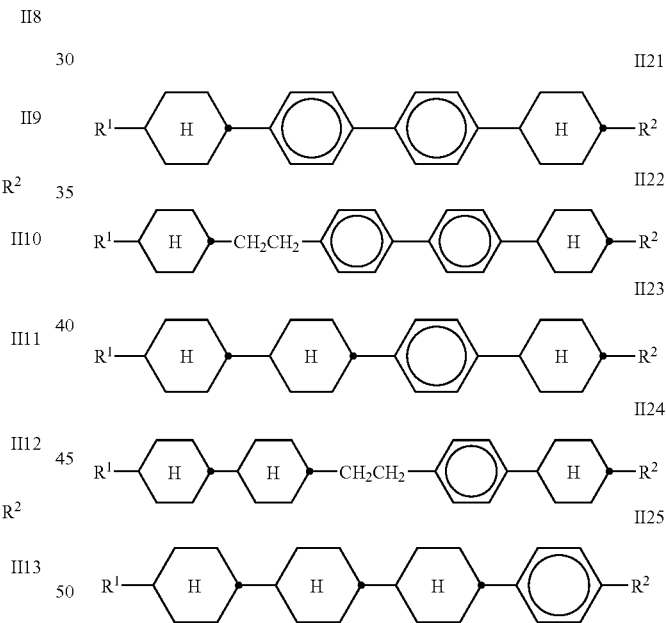

in which $R^1$ and $R^2$ have the meaning given; in claim 1 and the 1,4-phenylene groups in II21 to II25 can each, independently of one another, also be mono- or polysubstituted by fluorine.

Finally, those mixtures are preferred whose component A contains one or more-compounds selected from the group consisting of II26 and II27:

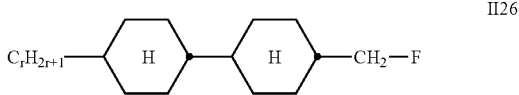

-continued

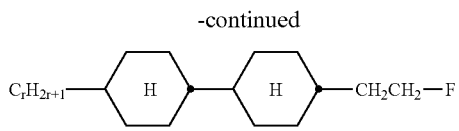
II27 in which $C_xH_{2x+1}$ is a straight-chain alkyl group of up to 7 carbon atoms.

In some cases, the addition of compounds of the formula

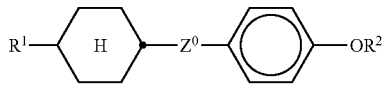

in which
$R^1$ and $R^2$ have the meaning given in claim 1 and
$Z^0$ is a single bond, —$CH_2CH_2$—,

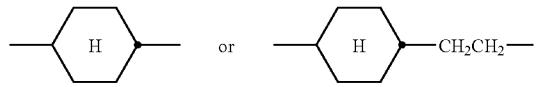

proves to be advantageous for suppressing smectic phases, although the resistivity is thereby lowered. Whether and in which amount these compounds should be added for achieving optimum parameter combinations for practical application can easily be determined by one skilled in the art. Usually, less than 15%, in particular 5–10%, are used.

Further preference is given to liquid crystal mixtures which, in addition to components A, B and C, additionally contain one or more compounds selected from the group consisting of III and IV:

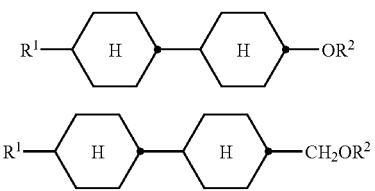

III

IV in which $R^1$ and $R^2$ have the abovementioned meaning and/or one or more compounds selected from the group consisting of V and VI

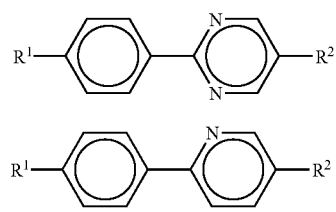

V

VI in which $R^1$ and $R^2$ have the abovementioned meaning and/or one or more compounds selected from the group consisting of VII to XI

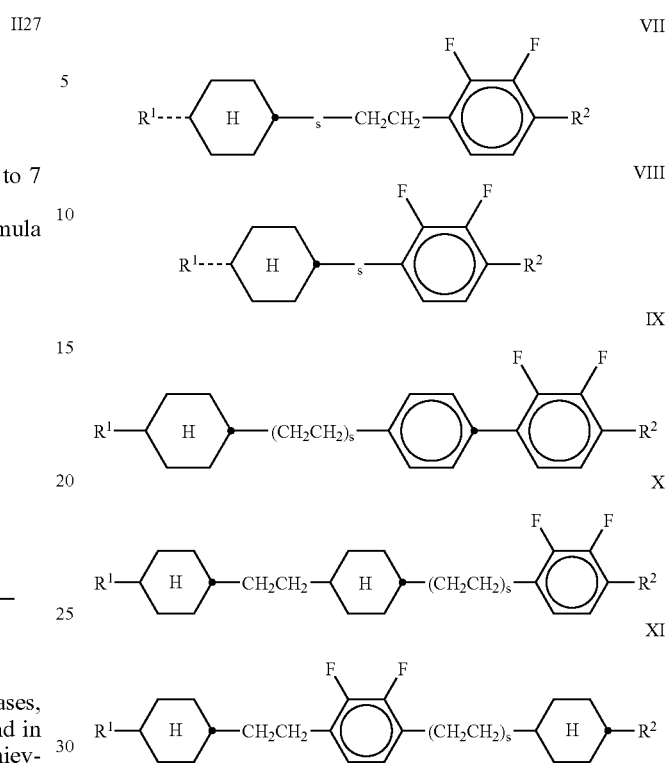

VII

VIII

IX

X

XI in which $R^1$ and $R^2$ have the abovementioned meaning and s is 0 or 1.

The amounts of the compounds of the formulae III to XI in the mixtures according to the invention (preferred ranges) can be seen from the table below:

Sum of compounds III and IV: 0% to 40%, preferably 10% to 30%

Sum of compounds V and VI: 0% to 40%, preferably 5% to 20%

Sum of compounds VII to XI: 0% to 20%, preferably 5% to 15%

It goes without saying that the mixtures according to the invention, which preferably consist essentially of the compounds mentioned as preferred for components A to C, may additionally also contain further compounds not mentioned here explicitly. However, this leads in many cases to more unfavourable properties. One skilled in the art can easily determine whether and in which amounts further compounds can be used.

The design of the MLC display according to the invention which consists of polarizers, electrode base plates and electrodes which have been subjected to surface treatment is that which is customary for this type of display. The definition of customary design is in this case very broad and also comprises all modifications and alterations of the MLC display, in particular also matrix display elements based on poly-Si TFT or MIM.

However, a significant difference between the displays according to the invention and those which have been customary so far and are based on the twisted nematic cell is the selection of the liquid crystal parameters of the liquid crystal layer.

The preparation of the liquid crystal mixtures to be used according to the invention is carried out in the usual manner.

As a rule, the desired amount of the components used in a minor amount is dissolved in the components which constitute the major component, advantageously at elevated temperature. It is also possible to mix-solutions of the components in an organic solvent, for example in acetone, chloroform or methanol, and remove the solvent again after the mixing, for example by distillation.

The dielectrics can also contain further additives known to one skilled in the art and described in the literature. For example, 0–15% pleochroic colorants or chiral doping substances can be added.

The examples which follow are intended to illustrate the invention without limiting it. Hereinbefore and hereinafter all temperatures are given in ° C. The percentages are by weight.

EXAMPLE 1

A matrix liquid crystal display of the TFT type containing a nematic liquid crystal mixture consisting of
17% of p-trans-4-propylcyclohexylbenzonitrile,
13% of p-trans-4-butylcyclohexylbenzonitrile,
22% of trans-1-p-propylphenyl-4-pentylcyclohexane,
4% of 1-[trans-4-(trans-4-propylcyclohexyl)-cyclohexyl]-2-(p-methylphenyl)-ethane,
4% of 1-[trans-4-(trans-4-propylcyclohexyl)-cyclohexyl]-2-(p-ethylphenyl)-ethane,
4% of 1-[trans-4-(trans-4-propylcyclohexyl)-cyclohexyl]-2-(p-propylphenyl)-ethane,
4% of 1-[trans-4-(trans-4-propylcyclohexyl)-cyclohexyl]-2-(p-pentylphenyl)-ethane,
9% of 4-ethyl-4'-(trans-4-propylcyclohexyl)-biphenyl,
9% of E-ethyl-4'-(trans-4-pentylcyclohexyl)-biphenyl,
4% of 4,4'-bis-(trans-4-propylcyclohexyl)-2-fluorobiphenyl,
4% of 4,4'-bis-(trans-4-pentylcyclohexyl)-2-fluorobiphenyl, and
6% of 4-(trans-4-pentylcyclohexyl)-4-(trans-4-propylcyclohexyl)-2-fluorobiphenyl has a resistivity of $3 \times 10^{12}$ Ωcm. The nematic mixture has a clear point of 91°, a viscosity of 18 mPa·s at 20°, a mean DC of 5.0 and an optical anisotropy of 0.118.

EXAMPLE 2

A nematic mixture consisting of
17% of p-trans-4-propylcyclohexylbenzonitrile,
13% of p-trans-4-butylcyclohexylbenzonitrile,
13% of trans,trans-4-pentyl-4'-fluoromethyl-cyclohexylcyclohexane,
13% of trans,trans-4-propyl-4'-fluoromethyl-cyclohexylcyclohexane,
4% of 1-[trans-4-(trans-4-propylcyclohexyl)-cyclohexyl]-2-(p-methylphenyl)-ethane,
4% of 1-[trans-4-(trans-4-propylcyclohexyl)-cyclohexyl]-2-(p-ethylphenyl)-ethane,
4% of 1-[trans-4-(trans-4-propylcyclohexyl)-cyclohexyl]-2-(p-propylphenyl)-ethane,
4% of 1-[trans-4-(trans-4-propylcyclohexyl)-cyclohexyl]-2-(p-pentylphenyl)-ethane,
7% of 4-ethyl-4'-(trans-4-propylcyclohexyl)-biphenyl,
7% of 4-ethyl-41-(trans-4-pentylcyclohexyl)-biphenyl,
4% of 4,4'-bis-(trans-4-propylcyclohexyl)-2-fluorobiphenyl,
4% of 4,4'-bis-(trans-4-pentylcyclohexyl)-2-fluorobiphenyl, and
6% of 4-(trans-4-pentylcyclohexyl)-4'-(trans-4-propylcyclohexyl)-2-fluorobiphenyl has a clear point of 93°, a viscosity of 19 mPa·s, a mean DC of 5.4, a Δn of 0.107 and a resistivity of $2.5 \times 10^{12}$ Ωcm.

EXAMPLE 3

A nematic mixture consisting of
10% of p-trans-4-pentylcyclohexyl-fluorobenzene,
17% of trans-1-p-propylphenyl-4-pentylcyclohexane,
10% of 1-[trans-4-(trans-4-propylcyclohexyl)-cyclohexyl]-2-(p-trifluoromethylphenyl)-ethane,
10% of 1-[trans-4-(trans-4-pentylcyclohexyl)-cyclohexyl]-2-(3,4-difluorophenyl)-ethane,
10% of 1-[trans-4-(trans-4-propylcyclohexyl)-cyclohexyl]-2-(3,4-difluorophenyl)-ethane,
20% of 1-[trans-4-(trans-4-propylcyclohexyl)-cyclohexyl]-2-(p-trifluoromethoxyphenyl)-ethane,
20% of 1-[trans-4-(trans-4-pentylcyclohexyl)-cyclohexyl]-2-(p-trifluoromethoxyphenyl)-ethane, and
3% of 4-(trans-4-pentylcyclohexyl)-41-(trans-4-propylcyclohexyl)-2-fluorobiphenyl has a clear point of 88°, a viscosity of 15.2 mPa·s, a mean DC of 4.3, a Δn of 0.078 and a resistivity of $8.6 \times 10^{13}$ Ωcm. This mixture is particularly suitable for operation in the first minimum according to Gooch and Tarry at a threshold voltage of 2.7 V.

EXAMPLE 4

A nematic mixture consisting of
4% of 4,4'-bis-(trans-4-propylcyclohexyl)-2-fluorobiphenyl,
10% of p-trans-4-pentylcyclohexyl-fluorobenzene,
12% of trans-1-p-propylphenyl-4-pentylcyclohexane,
10% of 1-[trans-4-(trans-4-propylcyclohexyl)-cyclohexyl]-2-(p-trifluoromethylphenyl)-ethane,
10% of 1-[trans-4-(trans-4-pentylcyclohexyl)-cyclohexyl]-2-(3,4-difluorophenyl)-ethane,
10% of 1-[trans-4-(trans-4-propylcyclohexyl)-cyclohexyl]-2-(3,4-difluorophenyl-ethane,
20% of 1-[trans-4-(trans-4-propylcyclohexyl)-cyclohexyl]-2-(p-trifluoromethoxyphenyl)-ethane,
20% of 1-[trans-4-(trans-4-pentylcyclohexyl)-cyclohexyl)-2-(p-trifluoromethoxyphenyl)-ethane, and
4% of 4-(trans-4-pentylcyclohexyl)-4'-(trans-4-propylcyclohexyl)-2-fluorobiphenyl has a clear point of 91°, a Δn of 0.076, a mean DC of 4.2 and a resistivity of $7.3 \times 10^{13}$ Ωcm.

EXAMPLE 5

A nematic mixture consisting of
13% of p-trans-4-propylcyclohexylbenzonitrile,
8% of p-trans-4-butylcyclohexylbenzonitrile,
15% of trans,trans-4-pentyl-4'-fluoromethyl-cyclohexylcyclohexane,
17% of trans,trans-4-propyl-4'-fluoromethyl-cyclohexylcyclohexane,
4% of 1-[trans-4-(trans-4-propylcyclohexyl)-cyclohexyl]-2-(p-methylphenyl)-ethane,
4% of 1-[trans-4-(trans-4-propylcyclohexyl)-cyclohexyl]-2-(p-ethylphenyl)-ethane,
4% of 1-[trans-4-(trans-4-propylcyclohexyl)-cyclohexyl]-2-(p-propylphenyl)-ethane,
4% of 1-[trans-4-(trans-4-propylcyclohexyl)-cyclohexyl]-2-(p-pentylphenyl)-ethane,
9% of 4-ethyl-4'-(trans-4-propylcyclohexyl)-biphenyl,
8% of 4-ethyl-4'-(trans-4-pentylcyclohexyl)-biphenyl, 4% of 4,4'-bis-(trans-4-propylcyclohexyl)-2-fluorobiphenyl,
4% of 4,4'-bis-(trans-4-pentylcyclohexyl)-2-fluorobiphenyl, and
6% of 4-(trans-4-pentylcyclohexyl)-4'-(trans-4-propylcyclohexyl)-2-fluorobiphenyl has a clear point of 96°, a Δn of 0.103, a mean DC of 4.9 and a resistivity of $1.0 \times 10^{13}$ Ωcm. This mixture is particularly suitable for operation in the first minimum according to Gooch and Tarry at a threshold voltage of 2.3 V.

EXAMPLE 6

A nematic mixture consisting of
13% of p-trans-4-propylcyclohexylbenzonitrile,
13% of trans,trans-4-pentyl-4'-fluoromethyl-cyclohexylcyclohexane,
15% of trans,trans-4-propyl-4'-fluoromethyl-cyclohexylcyclohexane,
12% of trans,trans-4-pentyl-4'-(2-fluoroethyl)-cyclohexylcyclohexane,
4% of 1-[trans-4-(trans-4-propylcyclohexyl)-cyclohexyl]-2-(p-methylphenyl)-ethane,
4% of 1-[trans-4-(trans-4-propylcyclohexyl)-cyclohexyl]-2-(p-ethylphenyl)-ethane,
4% of 1-[trans-4-(trans-4-propylcyclohexyl)-cyclohexyl]-2-(p-propylphenyl)-ethane,
4% of 1-[trans-4-(trans-4-propylcyclohexyl)-cyclohexyl]-2-(p-pentylphenyl)-ethane,
9% of 4-ethyl-4'-(trans-4-propylcyclohexyl)-biphenyl,
8% of 4-ethyl-4'-(trans-4-pentylcyclohexyl)-biphenyl,
4% of 4,4'-bis-(trans-4-propylcyclohexyl)-2-fluorobiphenyl,
4% of 4,4'-bis-(trans-4-pentylcyclohexyl)-2-fluorobiphenyl, and
6% of 4-(trans-4-pentylcyclohexyl)-4'-(trans-4-propylcyclohexyl)-2-fluorobiphenyl has a clear point of 99°, a Δn of 0.097, a mean DC of 4.1 and a resistivity of $7.8 \times 10^{13}$ Ωcm. This mixture is particularly suitable for operation in the first minimum according to Gooch and Tarry at a threshold-voltage of 2.9 V.

EXAMPLE 7

A nematic mixture consisting of
16% of p-trans-4-propylcyclohexylbenzonitrile,
13% of trans,trans-4-pentyl-4'-fluoromethyl-cyclohexylcyclohexane,
13% of trans,trans-4-propyl-4'-fluoromethyl-cyclohexylcyclohexane,
11% of trans,trans-4-pentyl-4'-(2-fluoroethyl)-cyclohexylcyclohexane,
4% of 1-[trans-4-(trans-4-propylcyclohexyl)-cyclohexyl]-2-(p-methylphenyl)-ethane,
4% of 1-[trans-4-(trans-4-propylcyclohexyl)-cyclohexyl]-2-(p-ethylphenyl)-ethane,
4% of 1-[trans-4-(trans-4-propylcyclohexyl)-cyclohexyl]-2-(p-propylphenyl)-ethane,
4% of 1-[trans-4-(trans-4-propylcyclohexyl)-cyclohexyl]-2-(p-pentylphenyl)-ethane,
9% of 4-ethyl-4'-(trans-4-propylcyclohexyl)-biphenyl,
8% of 4-ethyl-4'-(trans-4-pentylcyclohexyl)-biphenyl,
4% of 4,4'-bis-(trans-4-propylcyclohexyl)-2-fluorobiphenyl,
4% of 4,4'-bis-(trans-4-pentylcyclohexyl)-2-fluorobiphenyl, and
6% of 4-(trans-4-pentylcyclohexyl)-4'-(trans-4-propyl-cyclohexyl)-2-fluorobiphenyl has a clear point of 99.5°, a Δn of 0.100, a mean DC of 4.2 and a resistivity of $7.5 \times 10^{13}$ Ωcm. This mixture is particularly suitable for operation in the first minimum according to Gooch and Tarry at a threshold voltage of 2.7 V.

EXAMPLE 8

A nematic mixture consisting of
17% of p-trans-4-propylcyclohexylbenzonitrile,
13% of trans,trans-4-pentyl-4'-fluoromethyl-cyclohexylcyclohexane,
13% of trans,trans-4-propyl-4'-fluoromethyl-cyclohexylcyclohexane,
9% of trans-1-p-propylphenyl-4-pentylcyclohexane,
4% of 1-[trans-4-(trans-4-propylcyclohexyl)-cyclohexyl]-2-(p-methylphenyl)-ethane,
4% of 1-[trans-4-(trans-4-propylcyclohexyl)-cyclohexyl]-2-(p-ethylphenyl)-ethane,
4% of 1-[trans-4-(trans-4-propylcyclohexyl)-cyclohexyl]-2-(p-propylphenyl)-ethane,
4% of 1-[trans-4-(trans-4-propylcyclohexyl)-cyclohexyl]-2-(p-pentylphenyl)-ethane,
9% of 4-ethyl-4'-(trans-4-propylcyclohexyl)-biphenyl,
9% of 4-ethyl-4'-(trans-4-pentylcyclohexyl)-biphenyl,
4% of 4,4'-bis-(trans-4-propylcyclohexyl)-2-fluorobiphenyl,
4% of 4,4'-bis-(trans-4-pentylcyclohexyl)-2-fluorobiphenyl, and
6% of 4-(trans-4-pentylcyclohexyl)-4'-(trans-4-propylcyclohexyl)-2-fluorobiphenyl has a clear point of 93.4°, a Δn of 0.108, a mean DC of 4.4 and a resistivity of $1.3 \times 10^{13}$ Ωcm. The viscosity at 20° is 18.4 mPa·s.

EXAMPLE 9

A nematic mixture consisting of
17% of p-trans-4-propylcyclohexylbenzonitrile,
13% of trans,trans-4-pentyl-4'-fluoromethyl-cyclohexylcyclohexane,
13% of trans,trans-4-propyl-4'-fluoromethyl-cyclohexylcyclohexane,
11% of trans-1-p-propylphenyl-4-pentylcyclohexane,
4% of 1-[trans-4-(trans-4-propylcyclohexyl)-cyclohexyl]-2-(p-methylphenyl)-ethane,
4% of 1-[trans-4-(trans-4-propylcyclohexyl)-cyclohexyl]-2-(p-ethylphenyl)-ethane,
4% of 1-[trans-4-(trans-4-propylcyclohexyl)-cyclohexyl]-2-(p-propylphenyl)-ethane,
4% of 1-[trans-4-(trans-4-propylcyclohexyl)-cyclohexyl]-2-(p-pentylphenyl)-ethane,
8% of 4-ethyl-4'-(trans-4-propylcyclohexyl)-biphenyl,
8% of 4-ethyl-4'-(trans-4-pentylcyclohexyl)-biphenyl,
4% of 4,4'-bis-(trans-4-propylcyclohexyl)-2-fluorobiphenyl,
4% of 4,4'-bis-(trans-4-pentylcyclohexyl)-2-fluorobiphenyl, and
6% of 4-(trans-4-pentylcyclohexyl)-4'-(trans-4-propylcyclohexyl)-2-fluorobiphenyl has a clear point of 89.8°, a Δn of 0.102, a mean DC of 4.4, a resistivity of $1.5 \times 10^{13}$ Ωcm and a viscosity of 16.1 mPa·s.

EXAMPLE 10

A nematic mixture consisting of
8% of p-trans-4-propylcyclohexyl-fluorobenzene,
7% of p-trans-4-pentylcyclohexyl-fluorobenzene,
8% of p-trans-4-hexylcyclohexyl-fluorobenzene, 7% of p-trans-4-heptylcyclohexyl-fluorobenzene,
5% of 1-[trans-4-(trans-4-propylcyclohexyl)-cyclohexyl]-2-(2,3',4'-trifluorobiphenyl-4-yl)-ethane,
5% of 1-[trans-4-(trans-4-pentylcyclohexyl)-cyclohexyl]-2-(2,3',4'-trifluorobiphenyl-4-yl)-ethane,
8% of trans,trans-1-(p-ethylphenyl)-4-propyl-cyclohexylcyclohexane,
7% of trans,trans-1-(p-propylphenyl)-4-pentyl-cyclohexylcyclohexane,
8% of trans,trans-1-(p-fluorophenyl)-4-propyl-cyclohexylcyclohexane,
7% of trans,trans-1-(p-fluorophenyl)-4-pentyl-cyclohexylcyclohexane,
6% of trans,trans-1-(p-trifluoromethoxyphenyl)-4-propyl-cyclohexylcyclohexane,
4% of trans,trans-1-(p-trifluoromethoxyphenyl)-4-pentyl-cyclohexylcyclohexane,
6% of trans,trans-1-[p-(1,1,2,2-tetrafluoroethoxy)-phenyl]-4-propyl-cyclohexylcyclohexane,
4% of trans,trans-1-[p-(1,1,2,2-tetrafluoroethoxy)-phenyl]-4-pentyl-cyclohexylcyclohexane,
3% of 4,4'-bis-(trans-4-propylcyclohexyl)-2-fluorobiphenyl,
3% of 4,4'-bis-(trans-4-pentylcyclohexyl)-2-fluorobiphenyl and
4% of 4-(trans-4-pentylcyclohexyl)-4'-(trans-4-propylcyclohexyl)-2-fluorobiphenyl has a clear point of 92°, a Δn of 0.099, a mean DC of 4.1, a resistivity of 5.4×10$^{13}$ Ωcm and a viscosity of only 14 mPa·s.

EXAMPLE 11

A nematic mixture consisting of
10% of p-trans-4-propylcyclohexylbenzonitrile,
2.2% of trans-1-p-propylphenyl-4-pentylcyclohexane,
5% of 4,4'-bis-propylbiphenyl,
5% of trans,trans-4-propyl-4'-methyl-cyclohexylcyclohexane,
4% of 1-[trans-4-(trans-4-propylcyclohexyl)-cyclohexyl]-2-(p-methylphenyl)-ethane,
4% of 1-[trans-4-(trans-4-propylcyclohexyl)-cyclohexyl]-2-(p-ethylphenyl)-ethane,
4% of 1-[trans-4-(trans-4-propylcyclohexyl)-cyclohexyl]-2-(p-propylphenyl)-ethane,
4% of 1-[trans-4-(trans-4-propylcyclohexyl)-cyclohexyl]-2-(p-pentylphenyl)-ethane,
5% of 1,4-bis-(trans-4-propylcyclohexyl)-benzene,
9% of 4-ethyl-4'-(trans-4-propylcyclohexyl)-biphenyl,
9% of 4-ethyl-4'-(trans-4-pentylcyclohexyl)-biphenyl,
5% of 1-(trans-4-propylcyclohexyl)-2-(4'-ethyl-2'-fluorobiphenyl-4-yl)-ethane,
4% of 4,4'-bis-(trans-4-propylcyclohexyl)-2-fluorobiphenyl,
4% of 4,4'-bis-(trans-4-pentylcyclohexyl)-2-fluorobiphenyl and,
6% of 4-(trans-4-pentylcyclohexyl)-4'-(trans-4-propylcyclohexyl)-2-fluorobiphenyl, has a clear point of 95°, a viscosity of 16 mPa·s, a Δn of 0.113, a mean DC of 3.8 and a resistivity of 7×10$^{13}$ Ωcm.

EXAMPLE 12

A nematic mixture consisting of
17% of p-trans-4-propylcyclohexylbenzonitrile,
11% of trans-1-p-propylphenyl-4-pentylcyclohexane,
13% of trans,trans-4-pentyl-4'-fluoromethyl-cyclohexylcyclohexane,
13% of trans,trans-4-propyl-4'-fluoromethyl-cyclohexylcyclohexane,
4% of 1-[trans-4-(trans-4-propylcyclohexyl)-cyclohexyl]-2-(p-methylphenyl)-ethane,
4% of 1-[trans-4-(trans-4-propylcyclohexyl)-cyclohexyl]-2-(p-ethylphenyl)-ethane,
4% of 1-[trans-4-(trans-4-propylcyclohexyl)-cyclohexyl]-2-(p-propylphenyl)-ethane,
4% of 1-[trans-4-(trans-4-propylcyclohexyl)-cyclohexyl]-2-(p-pentylphenyl)-ethane,
8% of 4-ethyl-4'-(trans-4-propylcyclohexyl)-biphenyl,
8% of E[sic]-ethyl-4'-(trans-4-pentylcyclohexyl)-biphenyl,
4% of 4,4'-bis-(trans-4-propylcyclohexyl)-2-fluorobiphenyl,
4% of 4,4'-bis-(trans-4-pentylcyclohexyl)-2-fluorobiphenyl and
6% of 4-(trans-4-pentylcyclohexyl)-4'-(trans-4-propylcyclohexyl)-2-fluorobiphenyl has a clear point of 90°, a viscosity of 18 mPa·s and a Δn of 0.102.

EXAMPLE 13

A nematic mixture consisting of
14% of p-trans-4-propylcyclohexylbenzonitrile,
14% of trans-1-p-fluorophenyl-4-pentylcyclohexane,
14% of trans-1-p-fluorophenyl-4-heptylcyclohexane,
10% of trans-1-p-propylphenyl-4-pentylcyclohexane,
6% of 1-[trans-4-(trans-4-propylcyclohexyl)-cyclohexyl]-2-(p-fluorophenyl)-ethane,
6% of 1-[trans-4-(trans-4-pentylcyclohexyl)-cyclohexyl]-2-(p-fluorophenyl)-ethane,
5% of 1-[trans-4-(trans-4-pentylcyclohexyl)-cyclohexyl]-2-(p-trifluoromethylphenyl)-ethane,
5% of 4,4'-bis-(trans-4-propylcyclohexyl)-biphenyl,
5% of 4,4'-bis-(trans-4-propylcyclohexyl)-2-fluorobiphenyl,
5% of 4,4'-bis-(trans-4-pentylcyclohexyl)-2-fluorobiphenyl,
5% of 4,4'-bis-(trans-4-pentylcyclohexyl)-biphenyl,
5% of 4-(trans-4-pentylcyclohexyl)-41-(trans-4-propylcyclohexyl)-biphenyl and
6% of 4-(trans-4-pentylcyclohexyl)-4'-(trans-4-propylcyclohexyl)-2-fluorobiphenyl has a clear point of 95°, a viscosity of 17 mPa·s and a Δn of 0.105.

The following mixtures are very suitable for MLC displays:

EXAMPLE 14

A nematic mixture is prepared which consists of:
10% of 1-(trans-4-pentylcyclohexyl)-2-(4'-fluorobiphenyl-4-yl)-ethane,
17% of trans-1-p-propylphenyl-4-pentylcyclohexane,
10% of 1-[trans-4-(trans-4-propylcyclohexyl)-cyclohexyl)-2-(p-trifluoromethylphenyl)-ethane,
10% of 1-(trans-4-pentylcyclohexyl)-2-[trans-4-(3,4-difluorophenyl)-cyclohexyl]-ethane,
10% of 1-[trans-4-(trans-4-propylcyclohexyl)-cyclohexyl]-2-(3,4-difluorophenyl)-ethane,
20% of 1-[trans-4-(trans-4-propylcyclohexyl)-cyclohexyl]-2-(p-trifluoromethoxyphenyl)-ethane,
20% of 1-trans-4-(trans-4-pentylcyclohexyl)-cyclohexyl]-2-(p-trifluoromethoxyphenyl)-ethane, and
3% of 4-(trans-4-pentylcyclohexyl)-4'-(trans-4-propylcyclohexyl)-2-fluorobiphenyl.

EXAMPLE 15

A nematic mixture is prepared which consists of:
4% of 4,4'-bis-(trans-4-propylcyclohexyl)-2-fluorobiphenyl,
10% of p-trans-4-pentylcyclohexyl-fluorobenzene,
12% of trans,trans-4-propyl-4'-methoxymethyl-cyclohexyl-cyclohexane,
10% of 1-[trans-4-(trans-4-propylcyclohexyl)-cyclohexyl]-2-(p-trifluoromethylphenyl)-ethane,
10% of 1-[trans-4-(trans-4-pentylcyclohexyl)-cyclohexyl]-2-(3,4-difluorophenyl)-ethane,
10% of 1-[trans-4-(trans-4-propylcyclohexyl)-cyclohexyl)-2-(3,4-difluorophenyl)-ethane,
20% of 1-[trans-4-(trans-4-propylcyclohexyl)-cyclohexyl]-2-(p-trifluoromethoxyphenyl)-ethane,
20% of 1-[trans-4-(trans-4-pentylcyclohexyl)-cyclohexyl]-2-(p-trifluoromethoxyphenyl)-ethane, and
4% of 4-(trans-4-pentylcyclohexyl)-4'-(trans-4-propylcyclohexyl)-2-fluorobiphenyl.

EXAMPLE 16

A nematic mixture is prepared which consists of:
13% of 1-(trans-4-propylcyclohexyl)-2-(p-cyanophenyl)-ethane,
8% of p-[trans-4-(trans-4-pentylcyclohexyl)-cyclohexyl]-benzonitrile,
18% of trans,trans-4-pentyl-4'-fluoromethyl-cyclohexylcyclohexane,
17% of trans,trans-4-propyl-4'-fluoromethyl-cyclohexylcyclohexane,
4% of 1-(trans-4-propylcyclohexyl)-2-(trans-4-pentylcyclohexyl)-ethane,
4% of 1-(p-(trans-4-propylcyclohexyl-phenyl]-2-(trans-4-pentylcyclohexyl)-ethane,
4% of 1-[trans-4-(trans-4-propylcyclohexyl)-cyclohexyl]-2-(p-propylphenyl)-ethane,
4% of 1-[trans-4-(trans-4-propylcyclohexyl)-cyclohexyl]-2-(p-pentylphenyl)-ethane,
9% of 4-ethyl-4'-(trans-4-propylcyclohexyl)-biphenyl,
8% of 4-ethyl-4'-(trans-4-pentylcyclohexyl)-biphenyl,
4% of 4,4'-bis-(trans-4-propylcyclohexyl)-2-fluorobiphenyl,
4% of 4,4'-bis-(trans-4-pentylcyclohexyl)-2-fluorobiphenyl, and
6% of 4-(trans-4-pentylcyclohexyl)-4'-(trans-4-propylcyclohexyl)-2-fluorobiphenyl.

EXAMPLE 17

A nematic mixture is prepared which consists of:
13% of p-trans-4-propylcyclohexylbenzonitrile,
13% of trans,trans-4-pentyl-4'-fluoromethyl-cyclohexylcyclohexane,
15% of trans,trans-4-propyl-4'-fluoromethyl-cyclohexylcyclohexane,
12% of 1-(trans-4-pentylcyclohexyl)-4-propylcyclohex-1-ene,
4% of 1-[trans-4-(trans-4-pentylcyclohexyl)-cyclohexyl]-4-propylcyclohex-1-ene,
4% of 1-[trans-4-(trans-4-propylcyclohexyl)-cyclohexyl]-2-(p-ethylphenyl)-ethane,
4% of 1-[trans-4-(trans-4-propylcyclohexyl)cyclohexyl]-2-(p-propylphenyl)-ethane,
4% of 1-[trans-4-(trans-4-propylcyclohexyl)-cyclohexyl]-2-(p-pentylphenyl)-ethane,
9% of 4-ethyl-4'-(trans-4-propylcyclohexyl)-biphenyl,
8% of 4-ethyl-4'-(trans-4-pentylcyclohexyl)-biphenyl,
4% of 4,4'-bis-(trans-4-propylcyclohexyl)-2-fluorobiphenyl,
4% of 4,4'-bis-(trans-4-pentylcyclohexyl)-2-fluorobiphenyl, and
6% of 4-(trans-4-pentylcyclohexyl)-4'-(trans-4-propylcyclohexyl)-2-fluorobiphenyl.

EXAMPLE 18

A nematic mixture is prepared which consists of:
16% of p-trans-4-propylcyclohexylbenzonitrile,
13% of trans,trans-4-pentyl-4'-fluoromethyl-cyclohexylcyclohexane,
13% of trans,trans-4-propyl-4'-fluoromethyl-cyclohexylcyclohexane,
11% of trans,trans-4-pentyl-4'-(2-fluoroethyl)-cyclohexylcyclohexane,
4% of 1-(trans-4-propylcyclohexyl)-2-(4-pentylbiphenyl-4'-yl)-ethane,
4% of 1-[p-(trans-4-pentylcyclohexyl)-phenyl]-2-(p-propylphenyl)-ethane,
4% of 1-(trans-4-pentylcyclohexyl)-2-[trans-4-(p-propylphenyl)-cyclohexyl]-ethane,
4% of 1-[trans-4-(trans-4-propylcyclohexyl)-cyclohexyl]-2-(p-pentylphenyl)-ethane,
9% of 4-ethyl-4'-(trans-4-propylcyclohexyl)-biphenyl,
8% of 4-ethyl-4'-(trans-4-pentylcyclohexyl)-biphenyl,
4% of 4,4'-bis-(trans-4-propylcyclohexyl)-2-fluorobiphenyl,
4% of 4,4'-bis-(trans-4-pentylcyclohexyl)-2-fluorobiphenyl, and
6% of 4-(trans-4-pentylcyclohexyl)-4'-(trans-4-propylcyclohexyl)-2-fluorobiphenyl.

EXAMPLE 19

A nematic mixture is prepared which consists of:
17% of p-trans-4-propylcyclohexylbenzonitrile,
13% of trans,trans-4-pentyl-4'-ethoxy-cyclohexylcyclohexane,
13% of trans,trans-4-propyl-4'-fluoromethyl-cyclohexylcyclohexane,
9% of trans-1-p-propylphenyl-4-pentylcyclohexane,
4% of 1-[trans-4-(trans-4-propylcyclohexyl)-cyclohexyl]-2-(p-methylphenyl)-ethane,
4% of 1-[trans-4-(trans-4-propylcyclohexyl)-cyclohexyl]-2-(p-ethylphenyl)-ethane,
4% of 1-[trans-4-(trans-4-propylcyclohexyl)-cyclohexyl]-2-(p-propylphenyl)-ethane,
4% of 1-[trans-4-(trans-4-propylcyclohexyl)-cyclohexyl]-2-(p-pentylphenyl)-ethane,
9% of 4-ethyl-4'-(trans-4-propylcyclohexyl)-biphenyl,
9% of 4-ethyl-4'-(trans-4-pentylcyclohexyl)-biphenyl,
4% of 4,4'-bis-(trans-4-propylcyclohexyl)-2-fluorobiphenyl,
4% of 4,4'-bis-(trans-4-pentylcyclohexyl)-2-fluorobiphenyl, and
6% of 4-(trans-4-pentylcyclohexyl)-4'-(trans-4-propylcyclohexyl)-2-fluorobiphenyl.

EXAMPLE 20

A nematic mixture is prepared which consists of:
17% of p-trans-4-propylcyclohexylbenzonitrile,
13% of trans,trans-4-pentyl-4'-methoxy-cyclohexylcyclohexane,
13% of trans,trans-4-propyl-4'-propoxy-cyclohexylcyclohexane,
11% of trans-1-p-propylphenyl-4-pentylcyclohexane, 4% of 1-[trans-4-(trans-4-propylcyclohexyl)-cyclohexyl]-2-(p-methylphenyl)-ethane,
4% of 1-[trans-4-(trans-4-propylcyclohexyl)-cyclohexyl]-2-(p-ethylphenyl)-ethane,
4% of 1-[trans-4-(trans-4-propylcyclohexyl)-cyclohexyl]-2-(p-propylphenyl)-ethane,
4% of 1-[trans-4-(trans-4-propylcyclohexyl)-cyclohexyl]-2-(p-pentylphenyl)-ethane,
8% of 4-ethyl-4'-(trans-4-propylcyclohexyl)-biphenyl,
8% of 4-ethyl-4'-(trans-4-pentylcyclohexyl)-biphenyl,
4% of 4,4'-bis-(trans-4-propylcyclohexyl)-2-fluorobiphenyl,
4% of 4,4'-bis-(trans-4-pentylcyclohexyl)-2-fluorobiphenyl, and
6% of 4-(trans-4-pentylcyclohexyl)-4'-(trans-4-propylcyclohexyl)-2-fluorobiphenyl.

EXAMPLE 21

A nematic liquid crystal mixture is prepared which consists of:
17% of p-trans-4-propylcyclohexylbenzonitrile,
13% of p-trans-4-butylcyclohexylbenzonitrile,
22% of trans-1-p-propylphenyl-4-pentylcyclohexane,
4% of 1-(trans-4-propylcyclohexyl)-2-(4-ethyl-2,3-difluoro-biphenyl-4'-yl)-ethane,
4% of 1-[trans-4-(trans-4-propylcyclohexyl)-cyclohexyl]-2-(p-ethylphenyl)-ethane,
4% of 1-[trans-4-(trans-4-propylcyclohexyl)-cyclohexyl]-2-(p-propylphenyl)-ethane,
4% of 1-[trans-4-(trans-4-propylcyclohexyl)-cyclohexyl]-2-(p-pentylphenyl)-ethane,
9% of 4-ethyl-4'-(trans-4-propylcyclohexyl)-biphenyl,
9% of 4-ethyl-4'-(trans-4-pentylcyclohexyl)-biphenyl,
4% of 4,4'-bis-(trans-4-propylcyclohexyl)-2-fluorobiphenyl,
4% of 4,4'-bis-(trans-4-pentylcyclohexyl)-2-fluorobiphenyl, and
6% of 4-(trans-4-pentylcyclohexyl)-4'-(trans-4-propylcyclohexyl)-2-fluorobiphenyl.

EXAMPLE 22

A nematic mixture is prepared which consists of:
15% of p-trans-4-propylcyclohexylbenzonitrile,
11% of p-trans-4-butylcyclohexylbenzonitrile,
11% of trans,trans-4-pentyl-4'-fluoromethyl-cyclohexylcyclohexane,
11% of trans,trans-4-propyl-4'-fluoromethyl-cyclohexylcyclohexane,
4% of 1-[trans-4-(trans-4-propylcyclohexyl)-cyclohexyl]-2-(p-methylphenyl)-ethane,
4% of 1-[trans-4-(trans-4-propylcyclohexyl)-cyclohexyl]-2-(p-ethylphenyl)-ethane,
4% of 1-[trans-4-(trans-4-propylcyclohexyl)-cyclohexyl]-2-(p-propylphenyl)-ethane,
4% of 1[-trans-4-(trans-4-propylcyclohexyl)-cyclohexyl]-2-(p-pentylphenyl)-ethane,
4% of 2-p-fluorophenyl-5-hexylpyrimidine,
4% of 2-p-fluorophenyl-5-pentylpyridine,
7% of 4-ethyl-4'-(trans-4-propylcyclohexyl)-biphenyl,
7% of 4-ethyl-4'-(trans-4-pentylcyclohexyl)-biphenyl,
4% of 4,4'-bis-(trans-4-propylcyclohexyl)-2-fluorobiphenyl,
4% of 4,4'-bis-(trans-4-pentylcyclohexyl)-2-fluorobiphenyl, and
6% of 4-(trans-4-pentylcyclohexyl)-4'-(trans-4-propylcyclohexyl)-2-fluorobiphenyl.

EXAMPLE 23

A nematic-mixture consisting of:
14% of p-trans-4-propylcyclohexylbenzonitrile,
10% of p-trans-4-pentylcyclohexyl-fluorobenzene,
10% of p-trans-4-heptylcyclohexyl-fluorobenzene,
20% of p-trans-4-pentylcyclohexyl-difluoromethoxy-benzene,
6% of 1-[trans-4-(trans-4-propylcyclohexyl)-cyclohexyl]-2-(p-fluorophenyl)-ethane,
6% of 1-[trans-4-(trans-4-pentylcyclohexyl)-cyclohexyl]-2-(p-fluorophenyl)-ethane,
5% of 1-[trans-4-(trans-4-propylcyclohexyl)-cyclohexyl]-2-(p-propylphenyl)-ethane,
5% of 4,4'-bis-(trans-4-propylcyclohexyl)-biphenyl,
4% of 4,4'-bis-(trans-4-pentylcyclohexyl)-biphenyl,
5% of 4,4'-bis-(trans-4-pentylcyclohexyl)-2-fluorobiphenyl,
5% of 4,4'-bis-(trans-4-propylcyclohexyl)-2-fluorobiphenyl,
5% of 4-(trans-4-pentylcyclohexyl)-4'-(trans-4-propylcyclohexyl)-biphenyl, and
5% of 4-(trans-4-pentylcyclohexyl)-4'-(trans-4-propylcyclohexyl)-2-fluorobiphenyl has a clear point of 93°, a viscosity of 17 mPa·s, a $\Delta n$ of 0.105 and a high resistivity.

EXAMPLE 24

A nematic mixture consisting of
10% of p-trans-4-pentylcyclohexyl-fluorobenzene,
10% of p-trans-4-hexylcyclohexyl-fluorobenzene,
10% of p-trans-4-heptylcyclohexyl-fluorobenzene,
20% of p-[trans-4-(trans-4-propylcyclohexyl)-cyclohexyl]-trifluoromethoxybenzene,
10% of 1-[trans-4-(trans-4-propylcyclohexyl)-cyclohexyl]-2-(p-trifluoromethylphenyl)-ethane,
10% of 1-[trans-4-(trans-4-propylcyclohexyl)-cyclohexyl]-2-(p-trifluoromethoxyphenyl)-ethane,
20% of 1-[trans-4-(trans-4-pentylcyclohexyl)-cyclohexyl]-2-(p-trifluoromethoxyphenyl)-ethane, and
10% of 4-trifluoromethoxy-4'-(trans-4-pentylcyclohexyl)-biphenyl has a clear point of 80°, a $\Delta n$ of 0.079, a threshold voltage $V_{(10/0/20)}$ of 2.27 volt and a very low viscosity.

EXAMPLE 25

A nematic mixture consisting of
25% of p-trans-4-propylcyclohexyl-trifluoromethoxybenzene,
20% of 4-trifluoromethoxy-4'-(trans-4-pentylcyclohexyl)-biphenyl,
15% of p-[trans-4-(trans-4-propylcyclohexyl)-cyclohexyl]-trifluoromethoxybenzene,
20% of 1-[trans-4-(trans-4-propylcyclohexyl)-cyclohexyl]-2-(p-trifluoromethoxyphenyl)-ethane, and
20% of 1-[trans-4-(trans-4-pentylcyclohexyl-cyclohexyl]-2-(p-trifluoromethoxyphenyl)-ethane has a clear point of 54°, a $\Delta n$ of 0.088, a threshold voltage $V_{(10/0/20)}$ of 2.18 volt and a very low viscosity.

EXAMPLE 26

A nematic mixture consisting of
10% of p-trans-4-pentylcyclohexyl-fluorobenzene,
10% of p-trans-4-hexylcyclohexyl-fluorobenzene, 12% of p-trans-4-hexylcyclohexyl-difluoromethoxybenzene, 10% of 1-[trans-4-(trans-4-propylcyclohexyl)-cyclohexyl]-2-(p-fluorophenyl)-ethane, 11% of 1-[trans-4-(trans-4-pentylcyclohexyl)-cyclohexyl]-2-(p-fluorophenyl)-ethane, 11% of 1-[trans-4-(trans-4-propylcyclohexyl)-cyclohexyl]-2-(p-trifluoromethoxyphenyl)-ethane, 11% of 1-trans-4-(trans-4-pentylcyclohexyl)-cyclohexyl]-2-(p-trifluoromethoxyphenyl)-ethane, 11% of 1-[trans-4-(trans-4-propylcyclohexyl)-cyclohexyl]-2-(p-trifluoromethylphenyl)-ethane, 10% of p-[trans-4-(trans-4-propylcyclohexyl]-trifluoromethoxybenzene and 4% of 4,4'-bis-(trans-4-pentylcyclohexyl)-biphenyl has a clear point of 87°, a Δn of 0.0798; a dielectric anisotropy of +6.5, a threshold voltage of $V_{(10/0/20)}$ of 2.25 volt and a very low viscosity.

EXAMPLE 27

A nematic mixture consisting of

10% of p-trans-4-propylcyclohexyl-trifluoromethoxybenzene,

10% of p-trans-4-propylcyclohexyl-difluoromethoxybenzene,

10% of 1-[trans-4-(trans-4-pentylcylcohexyl)-[sic]-cyclohexyl]-2-(p-trifluoromethylphenyl)-ethane, 10% of 1-[trans-4-(trans-4-propylcylcohexyl) [sic]-cyclohexyl]-2-(p-fluorophenyl)-ethane, 10% of 1-[trans-4-(trans-4-pentylcylcohexyl)[sic]-cyclohexyl]-2-(p-fluorophenyl)-ethane, 10% of 1-[trans-4-(trans-4-propylcylcohexyl) [sic]-cyclohexyl]-2-(p-trifluoromethoxphenyl)-ethane, 15% of 1-[trans-4-(trans-4-pentylcycohexyl) [sic]-cyclohexyl]-2-(p-trifluoromethoxyphenyl)-ethane, 10% of 1-[trans-4-(trans-4-propylcylcohexyl)[sic]-cyclohexyl]-2-(p-trifluoromethylphenyl)-ethane, 10% of p-[trans-4-(trans-4-pentylcylcohexyl)[sic]-cyclohexyl]-trifluoromethoxybenzene and 5% of 4-trifluoromethoxy-4'-(trans-4-pentylcyclohexyl)-biphenyl has a clear point of 81°, a Δn of 0.0795, a threshold voltage $V_{(10/0/20)}$ of 2.47 volt and a very low viscosity.

EXAMPLE 28

A nematic mixture consisting of

10% of p-trans-4-propylcyclohexyl-trifluoromethoxybenzene,

25% of p-trans-4-pentylcyclohexyl-difluoromethoxybenzene,

15% of p-[trans-4-(trans-4-propylcyclohexyl)-cyclohexyl]-trifluoromethoxybenzene, 15% of 1-[trans-4-(trans-4-propylcyclohexyl)-cyclohexyl]-2-(p-trifluoromethoxyphenyl)-ethane, 15% of 1-[trans-4-(trans-4-propylcyclohexyl)-cyclohexyl]-2-(p-trifluoromethylphenyl)-ethane, and 20% of 4-trifluoromethoxy-4'-trans-4-pentylcyclohexyl-biphenyl has a clear point of 71°, a Δn of 0.0878, a Δε of +6.1, a threshold voltage $V_{(10/0/20)}$ of 2.09 volt and a viscosity of 12 mPa·s at 20° C.

EXAMPLE 29

A nematic mixture consisting of

10% of p-trans-4-pentylcyclohexyl-fluorobenzene,

15% of p-trans-4-hexylcyclohexyl-fluorobenzene,

15% of p-trans-4-heptylcylcohexyl[sic]-fluorobenzene,

20% of p-[trans-4-(trans-4-propylcyclohexyl)-cyclohexyl]-trifluoromethoxybenzene, 20% of 1-[trans-4-(trans-4-propylcyclohexyl)-cyclohexyl]-2-(p-trifluoromethoxyphenyl)-ethane, and 20% of 1-[trans-4-(trans-4-pentylcyclohexyl)-cyclohexyl]-2-(p-trifluoromethoxyphenyl)-ethane, has a clear point of 65°, a viscosity of 11 mPa·s at 20°, a Δn of 0.074, a Δε of +5.6 and a threshold voltage $V_{(10/0/20)}$ of 2.06 volt.

The composition of the mixtures of Examples 30 to 58 is given below, the individual compounds being coded as follows:

PCH-301: trans-1-p-methoxyphenyl-4-propylcyclohexane

CCH-301: trans,trans-4-methoxy-4'-propylcyclohexylcyclohexane

CBC-33F: 4,4'-bis-(trans-4-propylcyclohexyl)-2-fluorobiphenyl

CBE-55F: 4,4'-bis-(trans-4-pentylcyclohexyl)-2-fluorobiphenyl

CBC-53F: 4-(trans-4-pentylcyclohexyl)-4'-(trans-4-propylcyclcohexyl)[sic]-2-fluorobiphenyl CBC-33: 4,4'-bis-(trans-4-propylcyclohexyl)-biphenyl CBC-55: 4,4'-bis-(trans-4-pentylcyclohexyl)-biphenyl CBC-53: 4-(trans-4-pentylcyclohexyl)-4'-(trans-4-propylcyclohexyl)-biphenyl ECCP-33: 1-[trans-4-(trans-4-propylcyclohexyl)-cyclohexyl]-2-(p-propylphenyl)-ethane CCH-51F: trans,trans-4-fluoromethyl-4'-pentylcyclohexyl-cyclohexane CCH-31F: trans,trans-4-fluoromethyl-4'-propylcyclohexyl-cyclohexane PTP-102: 4-methyl-4'-ethoxy-tolan PTP-201: 4-methoxy-4'-ethyl-tolan CPTP-301: 4-(trans-4-propylcyclohexyl)-4'-methoxy-tolan CPTP-302: 4-(trans-4-propylcyclohexyl)-4'-ethoxy-tolan CPTP-303: 4-(trans-4-propylcyclohexyl)-4'-propoxy-tolan PCH-5F: trans-1-p-fluorophenyl-4-pentylcyclohexane PCH-6F: trans-1-p-fluorophenyl-4-hexylcyclohexane PCH-7F: trans-1-p-fluorophenyl-4-heptylcyclohexane EPCH-20CF$_3$: 1(trans-4-ethylcyclohexyl)-2-(p-trifluoromethoxyphenyl)-ethane EPCH-30CF$_3$: 1-(trans-4-propylcyclohexyl)-2-(p-trifluoromethoxyphenyl)-ethane EPCH-50CF$_3$: 1-(trans-4-pentylcyclohexyl)-2-(p-trifluoromethoxyphenyl)-ethane EPCH-70CF$_3$: 1-(trans-4-heptylcyclohexyl)-2-(p-trifluoromethoxyphenyl)-ethane PCH-30CF$_3$: trans-1-p-trifluoromethoxyphenyl-4-propylcyclohexane PCH-50CF$_3$: trans-1-p-trifluoromethoxyphenyl-4-pentylcyclohexane ECCP-30CF$_3$: 1-[trans-4-(trans-4-propylcyclohexyl)-cyclohexyl]-2-(p-trifluoromethoxyphenyl)-ethane ECCP-50CF$_3$: 1-[trans-4-(trans-4-pentylcyclohexyl)-cyclohexyl]-2-(p-trifluoromethoxyphenyl)-ethane CCP-20CF$_3$: p-trans-4-(trans-4-ethylcyclohexyl)-cyclohexyl]-trifluoromethoxybenzene CCP-30CF$_3$: p-[trans-4-(trans-4-propylcyclohexyl)-cyclohexyl]-trifluoromethoxybenzene CCP-40CF$_3$: p-[trans-4-(trans-4-butylcyclohexyl)-cyclohexyl]-trifluoromethoxybenzene
CCP-50CF$_3$: p-[trans-4-(trans-4-pentylcyclohexyl)-cyclohexyl]-trifluoromethoxybenzene
BCH-30CF$_3$: 4-trifluoromethoxy-4'-(trans-4-propylcyclohexyl)-biphenyl
ECCP-3F.F: 1-[trans-4-(trans-4-propylcyclohexyl)-cyclohexyl]-2-(3,4-difluorophenyl)-ethane
ECCP-5F.F: 1-[trans-4-(trans-4-pentylcyclohexyl)-cyclohexyl]-2-(3,4-difluorophenyl)-ethane
CCP-3F.F: 4-[trans-4-(trans-4-propylcyclohexyl)-cyclohexyl]-1,2-difluorobenzene
CCP-5F.F: 4-[trans-4-(trans-4-pentylcyclohexyl)-cyclohexyl]-1,2-difluorobenzene
CCP-3F: 4-[trans-4-(trans-4-propylcyclohexyl)-cyclohexyl]-fluorobenzene
ECCP-3F: 1-[trans-4-(trans-4-propylcyclohexyl)-cyclohexyl]-2-(p-fluorophenyl)-ethane
ECCP-5F: 1-[trans-4-(trans-4-pentylcyclohexyl)-cyclohexyl]-2-(p-fluorophenyl)-ethane
CP-3F: p-fluorophenyl trans-4-(trans-4-propylcyclohexyl)-cyclohexanecarboxylate
CP-5F: p-fluorophenyl trans-4-(trans-4-propylcyclohexyl)-cyclohexanecarboxylate
PYP-5F: 2-p-fluorophenyl-5-pentylpyrimidine
PYP-6F: 2-p-fluorophenyl-5-hexylpyrimidine
PYP-7F: 2-p-fluorophenyl-5-heptylpyrimidine
PYP-30CF$_3$: 2-p-trifluoromethoxyphenyl-5-propylpyrimidine
PYP-50CF$_3$: 2-p-trifluoromethoxyphenyl-5-pentylpyrimidine
PYP-70CF$_3$: 2-p-trifluoromethoxyphenyl-5-heptylpyrimidine
PCH-3: p-trans-4-propylcyclohexyl-benzonitrile
PCH-4: p-trans-4-butylcyclohexyl-benzonitrile
PCH-5: p-trans-4-pentylcyclohexyl-benzonitrile
ECCP-3: 1-[trans-4-(trans-4-propylcyclohexyl)-cyclohexyl]-2-(p-cyanophenyl)-ethane
ECCP-3CF$_3$: 1-[trans-4-(trans-4-propylcyclohexyl)-cyclohexyl]-2-(p-trifluoromethylphenyl)-ethane
ECCP-5CF$_3$: 1-[trans-4-(trans-4-pentylcyclohexyl)-cyclohexyl]-2-(p-trifluoromethylphenyl)-ethane
PYP-5N.F: 2-(3-fluoro-4-cyanophenyl)-5-pentylpyrimidine
PYP-7N.F: 2-(3-fluoro-4-cyanophenyl)-5-heptylpyrimidine
PCH-30CF$_2$: trans-1-p-difluoromethoxyphenyl-4-propylcyclohexane
PCH-50CF$_2$: trans-1-p-difluoromethoxyphenyl-4-pentylcyclohexane
PCH-30CF$_2$: trans-1-p-difluoromethoxyphenyl-4-propylcyclohexane
PCH-53: trans-1-p-propylphenyl-4-pentylcyclohexane

EXAMPLE 30

| | |
|---|---|
| PCH-301 | 10.00 |
| PCH-7F | 4.00 |
| EPCH-30CF$_3$ | 9.00 |
| EPCH-70CF$_3$ | 5.00 |
| CCP-30CF$_3$ | 13.00 |
| CCP-50CF$_3$ | 12.00 |
| ECCP-30CF$_3$ | 12.00 |
| ECCP-50CF$_3$ | 8.00 |
| ECCP-3F.F | 12.00 |
| ECCP-3F | 8.00 |
| CBC-33F | 2.00 |
| CBC-53F | 3.00 |
| CBC-55F | 2.00 |

EXAMPLE 31

| | |
|---|---|
| PCH-30CF$_2$ | 9.00 |
| PCH-40CF$_2$ | 8.00 |
| PCH-50CF$_2$ | 9.00 |
| CCH-301 | 7.00 |
| CCP-30CF$_3$ | 13.00 |
| CCP-50CF$_3$ | 12.00 |
| ECCP-30CF$_3$ | 8.00 |
| ECCP-50CF$_3$ | 6.00 |
| ECCP-3F.F | 9.00 |
| ECCP-3F | 6.00 |
| CBC-33F | 5.00 |
| CBC-53F | 4.00 |
| CBC-55F | 4.00 |

EXAMPLE 32

| | |
|---|---|
| CCH-301 | 7.00 |
| PCH-5F | 12.00 |
| PCH-7F | 9.00 |
| CCP-3OCF$_3$ | 13.00 |
| CCP-50CF$_3$ | 12.00 |
| ECCP-30CF$_3$ | 11.00 |
| ECCP-50CF$_3$ | 8.00 |
| ECCP-3F.F | 12.00 |
| ECCP-3F | 7.00 |
| CBC-33F | 3.00 |
| CBC-53F | 3.00 |
| CBC-55F | 3.00 |

EXAMPLE 33

| | |
|---|---|
| PCH-5F | 13.0 |
| PCH-7F | 10.0 |
| CCP-30CF$_3$ | 13.0 |
| CCP-40CF$_3$ | 11.0 |
| CCP-50CF$_3$ | 12.0 |
| ECCP-30CF$_3$ | 11.0 |
| ECCP-50CF$_3$ | 8.0 |
| ECCP-3F.F | 9.0 |
| ECCP-5F.F | 6.0 |
| CBC-33F | 3.0 |
| CBC-53F | 2.0 |
| CBC-55F | 2.0 |

EXAMPLE 34

| | |
|---|---|
| PCH-5F | 11.0 |
| PCH-6F | 4.0 |
| PCH-7F | 10.0 |
| CCP-20CF$_3$ | 9.0 |

-continued

| | |
|---|---|
| CCP-30CF$_3$ | 13.0 |
| CCP-40CF$_3$ | 7.0 |
| CCP-50CF$_3$ | 11.0 |
| ECCP-30CF$_3$ | 10.0 |
| ECCP-50CF$_3$ | 8.0 |
| ECCP-3F.F | 8.0 |
| CBC-33F | 3.0 |
| CBC-53F | 3.0 |
| CBC-55F | 3.0 |

EXAMPLE 35

| | |
|---|---|
| PCH-5F | 13.0 |
| PCH-7F | 10.0 |
| CCP-20CF$_3$ | 10.0 |
| CCP-30CF$_3$ | 13.0 |
| CCP-40CF$_3$ | 7.0 |
| CCP-50CF$_3$ | 11.0 |
| ECCP-30CF$_3$ | 11.0 |
| ECCP-3F.F | 10.0 |
| ECCF-3F | 8.0 |
| CBC-33F | 3.0 |
| CBC-53F | 2.0 |
| CBC-55F | 2.0 |

EXAMPLE 36

| | |
|---|---|
| PCH-5F | 13.0 |
| PCH-7F | 10.0 |
| CCP-20CF$_3$ | 10.0 |
| CCP-30CF$_3$ | 13.0 |
| CCP-40CF$_3$ | 7.0 |
| CCP-50CF$_3$ | 11.0 |
| ECCP-30CF$_3$ | 11.0 |
| ECCP-3F.F | 10.0 |
| ECCP-5F.F | 7.0 |
| CBC-33F | 3.0 |
| CBC-53F | 3.0 |
| CBC-55F | 2.0 |

EXAMPLE 37

| | |
|---|---|
| PCH-5F | 13.0 |
| PCH-7F | 10.0 |
| CCP-20CF$_3$ | 10.0 |
| CCP-30CF$_3$ | 13.0 |
| CCP-40CF$_3$ | 7.0 |
| CCP-50CF$_3$ | 11.0 |
| ECCP-3F.F | 10.0 |
| ECCP-5F.F | 8.0 |
| ECCP-3F | 11.0 |
| CBC-33F | 3.0 |
| CBC-53F | 2.0 |
| CBC-55F | 2.0 |

EXAMPLE 38

| | |
|---|---|
| PCH-5F | 12.0 |
| PCH-7F | 10.0 |
| CCP-20CF$_3$ | 11.0 |
| CCP-30CF$_3$ | 13.0 |
| CCP-40CF$_3$ | 7.0 |
| CCP-50CF$_3$ | 12.0 |
| ECCP-30CF$_3$ | 9.0 |
| ECCP-3F.F | 9.0 |
| ECCP-5F.F | 5.0 |
| ECCP-3F | 6.0 |
| CBC-33F | 3.0 |
| CBC-53F | 2.0 |

EXAMPLE 39

| | |
|---|---|
| PCH-5F | 12.0 |
| PCH-6F | 9.0 |
| PCH-7F | 10.0 |
| CCP-20CF$_3$ | 11.0 |
| CCP-30CF$_3$ | 13.0 |
| CCP-40CF$_3$ | 5.0 |
| CCP-50CF$_3$ | 12.0 |
| ECCP-3F.F | 9.0 |
| ECCP-5F.F | 5.0 |
| ECCP-3F | 5.0 |
| CBC-33F | 3.0 |
| CBC-53F | 3.0 |
| CBC-55F | 3.0 |

EXAMPLE 40

| | |
|---|---|
| PCH-5F | 12.0 |
| PCH-6F | 8.0 |
| PCH-7F | 10.0 |
| CCP-20CF$_3$ | 11.0 |
| CCP-30CF$_3$ | 13.0 |
| CCP-40CF$_3$ | 5.0 |
| CCP-50CF$_3$ | 12.0 |
| ECCP-3F.F | 11.0 |
| ECCP-5F.F | 8.0 |
| CBC-33F | 4.0 |
| CBC-53F | 3.0 |
| CBC-55F | 3.0 |

EXAMPLE 41

| | |
|---|---|
| PCH-5F | 10.0 |
| PCH-6F | 5.0 |
| PCH-7F | 7.0 |
| CCP-20CF$_3$ | 11.0 |
| CCP-30CF$_3$ | 13.0 |
| CCP-40CF$_3$ | 6.0 |
| CCP-50CF$_3$ | 11.0 |
| ECCP-30CF$_3$ | 7.0 |
| ECCP-50CF$_3$ | 3.0 |
| ECCP-3F.F | 9.0 |
| ECCP-5F.F | 4.0 |
| ECCP-3F | 7.0 |

-continued

| | |
|---|---|
| CBC-33F | 3.0 |
| CBC-53F | 2.0 |
| CBC-55F | 2.0 |

EXAMPLE 42

| | |
|---|---|
| PCH-3 | 19.0 |
| PCH-7F | 7.0 |
| CCP-20CF$_3$ | 11.0 |
| CCP-30CF$_3$ | 13.0 |
| CCP-40CF$_3$ | 6.0 |
| CCP-50CF$_3$ | 12.0 |
| ECCP-30CF$_3$ | 7.0 |
| ECCP-3F.F | 10.0 |
| ECCP-5F.F | 8.0 |
| ECCP-3F | 7.0 |

EXAMPLE 43

| | |
|---|---|
| PCH-3 | 20.00 |
| PCH-4 | 8.00 |
| PCH-5F | 8.00 |
| PCH-6F | 8.00 |
| PCH-7F | 7.00 |
| ECCP-3F | 7.00 |
| ECCP-5F | 7.00 |
| CP-3F | 12.00 |
| CP-5F | 12.00 |
| ECCP-3 | 11.00 |

EXAMPLE 44

| | |
|---|---|
| PCH-3 | 20.00 |
| PCH-5F | 9.00 |
| PCH-6F | 9.00 |
| PCH-7F | 9.00 |
| ECCP-3F | 8.00 |
| ECCP-5F | 8.00 |
| CP-3F | 12.00 |
| CP-5F | 12.00 |
| ECCP-3 | 13.00 |

EXAMPLE 45

| | |
|---|---|
| PCH-3 | 14.00 |
| PCH-5F | 14.00 |
| PCH-7F | 14.00 |
| PCH-53 | 10.00 |
| ECCP-3F | 6.00 |
| ECCP-5F | 6.00 |
| ECCP-3CF$_3$ | 5.00 |
| CBC-33 | 5.00 |
| CBC-53 | 5.00 |
| CBC-55 | 5.00 |
| CBC-33F | 5.00 |

-continued

| | |
|---|---|
| CBC-53F | 6.00 |
| CBC-55F | 5.00 |

EXAMPLE 46

| | |
|---|---|
| PCH-5F | 20.00 |
| PCH-6F | 15.00 |
| PCH-7F | 15.00 |
| ECCP-3F | 10.00 |
| ECCP-5F | 10.00 |
| CBC-33 | 5.00 |
| CBC-53 | 5.00 |
| CBC-55 | 5.00 |
| CBC-33F | 5.00 |
| CBC-53F | 5.00 |
| CBC-55F | 5.00 |

EXAMPLE 47

| | |
|---|---|
| PCH-3 | 24.00 |
| PCH-5F | 9.00 |
| PCH-7F | 8.00 |
| ECCP-3F | 8.00 |
| ECCP-5F | 8.00 |
| ECCP-30CF$_3$ | 11.00 |
| ECCP-50CF$_3$ | 11.00 |
| ECCP-3CF$_3$ | 11.00 |
| ECCP-3 | 10.00 |

EXAMPLE 48

| | |
|---|---|
| PCH-3 | 24.00 |
| PCH-5F | 7.00 |
| PCH-7F | 6.00 |
| CCH-31F | 6.00 |
| ECCP-3F | 5.00 |
| ECCP-5F | 5.00 |
| ECCP-30CF$_3$ | 11.00 |
| ECCP-50CF$_3$ | 11.00 |
| ECCP-3CF$_3$ | 11.00 |
| ECCP-3 | 4.00 |
| CP-3F | 5.00 |
| CP-5F | 5.00 |

EXAMPLE 49

| | |
|---|---|
| PCH-3 | 24.00 |
| CCH-31F | 7.00 |
| CCH-51F | 7.00 |
| ECCP-3F | 8.00 |
| ECCP-5F | 8.00 |
| ECCP-30CF$_3$ | 11.00 |
| ECCP-50CF$_3$ | 11.00 |

-continued

| | |
|---|---|
| ECCP-3CF$_3$ | 11.00 |
| ECCP-3 | 13.00 |

EXAMPLE 50

| | |
|---|---|
| PYP-5N.F | 5.00 |
| PYP-7N.F | 5.00 |
| PCH-3 | 14.00 |
| PCH-5F | 5.00 |
| CCH-31F | 7.00 |
| CCH-51F | 7.00 |
| ECCP-3F | 5.00 |
| ECCP-5F | 5.00 |
| ECCP-30CF$_3$ | 11.00 |
| ECCP-50CF$_3$ | 11.00 |
| ECCP-3CF$_3$ | 11.00 |
| ECCP-3 | 4.00 |
| CP-3F | 5.00 |
| CP-5F | 5.00 |

EXAMPLE 51

| | |
|---|---|
| PCH-5F | 10.00 |
| PCH-6F | 12.00 |
| PCH-7F | 12.00 |
| ECCP-3F | 14.00 |
| ECCP-5F | 14.00 |
| CP-3F | 15.00 |
| CP-5F | 15.00 |
| ECCP-3 | 8.00 |

EXAMPLE 52

| | |
|---|---|
| PCH-5F | 10.00 |
| PCH-6F | 10.00 |
| PCH-7F | 10.00 |
| ECCP-3F | 13.00 |
| ECCP-5F | 14.00 |
| ECCP-3CF$_3$ | 13.00 |
| CP-3F | 15.00 |
| CP-5F | 15.00 |

EXAMPLE 53

| | |
|---|---|
| PCH-3 | 16.00 |
| PCH-301 | 8.00 |
| CCP-30CF$_3$ | 9.00 |
| CCP-50CF$_3$ | 8.00 |
| ECCP-30CF$_3$ | 8.00 |
| ECCP-50CF$_3$ | 7.00 |
| ECCP-3F.F | 7.00 |
| ECCP-3F | 6.00 |
| ECCP-3CF$_3$ | 7.00 |
| BCH-30CF$_3$ | 7.00 |
| PTP-102 | 4.00 |

-continued

| | |
|---|---|
| PTP-201 | 4.00 |
| CPTP-301 | 2.00 |
| CPTP-302 | 2.00 |
| CPTP-303 | 3.00 |

EXAMPLE 54

| | |
|---|---|
| PCH-3 | 18.00 |
| PCH-301 | 8.00 |
| PYP-3F | 5.00 |
| PYP-50CF$_3$ | 5.00 |
| PYP-70CF$_3$ | 5.00 |
| CCP-30CF$_3$ | 9.00 |
| CCP-50CF$_3$ | 8.00 |
| ECCP-30CF$_3$ | 8.00 |
| ECCP-50CF$_3$ | 7.00 |
| ECCP-3F.F | 5.00 |
| ECCP-3F | 5.00 |
| BCH-30CF$_3$ | 7.00 |
| CPTP-301 | 3.00 |
| CPTP-302 | 3.00 |
| CPTP-303 | 4.00 |

EXAMPLE 55

| | |
|---|---|
| PCH-3 | 20.00 |
| PCH-301 | 10.00 |
| PCH-30CF$_2$ | 5.60 |
| PCH-40CF$_2$ | 5.60 |
| PCH-50CF$_2$ | 5.60 |
| CCP-30CF$_3$ | 7.00 |
| CCP-50CF$_3$ | 6.30 |
| ECCP-30CF$_3$ | 6.30 |
| ECCP-50CF$_3$ | 5.60 |
| ECCP-3F.F | 5.60 |
| ECCP-3CF$_3$ | 5.60 |
| BCH-30CF$_3$ | 7.00 |
| CPTP-301 | 3.50 |
| CPTP-302 | 2.80 |
| CPTP-303 | 3.50 |

EXAMPLE 56

| | |
|---|---|
| PCH-3 | 20.00 |
| PCH-301 | 10.00 |
| PYP-3F | 5.60 |
| PYP-5F | 5.60 |
| PYP-50CF$_3$ | 5.60 |
| PYP-70CF$_3$ | 5.60 |
| CCP-30CF$_3$ | 7.00 |
| CCP-50CF$_3$ | 6.30 |
| ECCP-30CF$_3$ | 6.30 |
| ECCP-50CF$_3$ | 5.60 |
| ECCP-3F.F | 5.60 |
| ECCP-3CF$_3$ | 5.60 |
| CPTP-301 | 3.50 |
| CPTP-302 | 3.50 |
| CPTP-303 | 4.20 |

EXAMPLE 57

| | |
|---|---|
| PCH-3 | 18.00 |
| PCH-5F | 12.00 |
| PCH-6F | 12.00 |
| PCH-7F | 10.00 |
| ECCP-3F | 7.00 |
| ECCP-5F | 7.00 |
| ECCP-33 | 5.00 |
| CBC-33 | 5.00 |
| CBC-53 | 5.00 |
| CBC-55 | 4.00 |
| CBC-33F | 5.00 |
| CBC-53F | 5.00 |
| CBC-55F | 5.00 |

EXAMPLE 58

| | |
|---|---|
| PCH-3 | 10.00 |
| PCH-5F | 18.00 |
| PCH-6F | 14.00 |
| PCH-7F | 10.00 |
| ECCP-3F | 9.00 |
| ECCP-5F | 7.00 |
| CBC-33 | 5.00 |
| CBC-53 | 6.00 |
| CBC-55 | 5.00 |
| CBC-33F | 5.00 |
| CBC-53F | 6.00 |
| CBC-55F | 5.00 |

The properties of the mixtures from Examples 30 to 58 are listed in the table below:

| Property | Example 30 | 31 | 32 | 33 | 34 | 35 | 36 | 37 | 38 | 39 |
|---|---|---|---|---|---|---|---|---|---|---|
| Clear point [° C.] | 100 | 101 | 100 | 103 | 100 | 101 | 101 | 100 | 101 | 88 |
| Vicosity at 20° (mPa · s) | 15 | 15 | 15 | | | | | 15 | 15 | 14 |
| $\Delta\epsilon$ | +4.0 | +6.6 | +5.9 | | | | | +4.0 | +4.6 | +4.0 |
| $\epsilon_{11}$ | 7.0 | | | | | | | 6.8 | 7.5 | 6.9 |
| $\Delta n$ | 0.090 | 0.090 | 0.084 | 0.076 | 0.087 | 0.084 | 0.085 | 0.081 | 0.081 | 0.091 |
| $V_{(10,0,20)}$[Volt] | 2.44 | 2.40 | 2.57 | 2.52 | 2.27 | 2.29 | 2.20 | 2.26 | 2.27 | 2.13 |

| Property | Example 40 | 41 | 42 | 43 | 44 | 45 | 46 | 47 | 48 | 49 |
|---|---|---|---|---|---|---|---|---|---|---|
| Clear point [° C.] | 90 | 102 | 98 | 82 | 84 | 95 | 89 | 87 | 84 | 101 |
| Vicosity at 20° (mPa · s) | 14 | 15 | 17 | 18 | 18 | 17 | 15 | 16 | 16 | 20 |
| $\Delta\epsilon$ | +4.0 | +3.9 | | +8.0 | +7.3 | +4.6 | +2.7 | +8.7 | +7.9 | +8.3 |
| $\epsilon_{11}$ | 7.0 | 6.6 | | 11.9 | 11.0 | 7.6 | | 12.1 | 11.5 | 11.8 |
| $\Delta n$ | 0.079 | 0.081 | 0.090 | 0.094 | 0.090 | 0.105 | 0.093 | 0.094 | 0.089 | 0.094 |
| $V_{(10,0,20)}$[Volt] | 2.20 | 2.33 | 1.90 | 1.71 | 1.75 | 2.15 | 2.98 | 1.82 | 1.86 | 1.98 |

| Property | Example 50 | 51 | 52 | 53 | 54 | 55 | 56 | 57 | 58 |
|---|---|---|---|---|---|---|---|---|---|
| Clear point [° C.] | 85 | 94 | 94 | 106 | 91 | 81 | 73 | 95 | 94 |
| Vicosity at 20° (mPa · s) | 19 | 17 | 17 | | | | | 17 | |
| $\Delta\epsilon$ | +10.2 | | | +6.9 | +8.1 | +6.5 | +8.7 | +5.2 | |
| $\epsilon_{11}$ | 14.2 | | | 10.4 | 11.8 | 10.8 | 12.8 | 8.4 | |
| $\Delta n$ | 0.096 | 0.074 | 0.072 | 0.132 | 0.125 | 0.113 | 0.125 | 0.105 | 0.101 |
| $V_{(10,0,20)}$[Volt] | 1.56 | 2.42 | 2.58 | 2.51 | 2.12 | 2.15 | 1.85 | 2.03 | 2.23 |

Further mixtures according to the invention are listed below:

EXAMPLE 59

| | |
|---|---|
| CCH-301 | 7.00 |
| PCH-5F | 12.00 |
| PCH-7F | 9.00 |
| CCP-3F.F | 13.00 |
| CCP-5F.F | 12.00 |
| ECCP-30CF$_3$ | 11.00 |
| ECCP-50CF$_3$ | 8.00 |
| ECCP-3F.F | 12.00 |
| ECCP-3F | 7.00 |
| CBC-33F | 3.00 |
| CBC-53F | 3.00 |
| CBC-55F | 3.00 |

EXAMPLE 60

| | |
|---|---|
| PCH-5F | 13.0 |
| PCH-7F | 10.0 |
| CCP-30CF$_3$ | 13.0 |
| CCP-40CF$_3$ | 11.0 |
| CCP-50CF$_3$ | 12.0 |
| ECCP-30CF$_3$ | 11.0 |
| ECCP-50CF$_3$ | 8.0 |
| CCP-3F.F | 9.0 |
| CCP-5F.F | 6.0 |
| CBC-33F | 3.0 |
| CBC-53F | 2.0 |
| CBC-55F | 2.0 |

EXAMPLE 61

| | |
|---|---|
| PCH-5F | 11.0 |
| PCH-6F | 4.0 |
| PCH-7F | 10.0 |
| CCP-20CF$_3$ | 9.0 |
| CCP-30CF$_3$ | 13.0 |
| CCP-40CF$_3$ | 7.0 |
| CCP-50CF$_3$ | 11.0 |
| CCP-3F.F | 10.0 |
| CCP-5F.F | 8.0 |
| CCP-3F | 8.0 |
| CBC-33F | 3.0 |
| CBC-53F | 3.0 |
| CBC-55F | 3.0 |

EXAMPLE 62

| | |
|---|---|
| PCH-3 | 20.0 |
| PCH-4 | 8.0 |
| PCH-5 | 8.0 |
| PCH-6F | 8.0 |
| PCH-7F | 7.0 |
| CCP-3F.F | 7.0 |
| CCP-5F.F | 7.0 |
| CP-3F | 12.0 |
| CCP-3F | 12.0 |
| ECCP-3 | 11.00 |

EXAMPLE 63

| | |
|---|---|
| PCH-3 | 14.00 |
| PCH-5F | 14.00 |
| PCH-7F | 14.00 |
| PCH-53 | 10.00 |
| CCP-3F | 6.00 |
| CCP-5F | 6.00 |
| CCP-3F.F | 5.00 |
| CBC-33 | 5.00 |
| CBC-53 | 5.00 |
| CBC-55 | 5.00 |
| CBC-33F | 5.00 |
| CBC-53F | 6.00 |
| CBC-55F | 5.00 |

EXAMPLE 64

| | |
|---|---|
| PCH-5F | 20.00 |
| PCH-6F | 15.00 |
| PCH-7F | 15.00 |
| CCP-3F.F | 10.00 |
| CCP-5F.F | 10.00 |
| CBC-33 | 5.00 |
| CBC-53 | 5.00 |
| CBC-55 | 5.00 |
| CBC-33F | 5.00 |
| CBC-53F | 5.00 |
| CBC-55F | 5.00 |

EXAMPLE 65

| | |
|---|---|
| PCH-3 | 16.00 |
| PCH-301 | 8.00 |
| CCP-30CF$_3$ | 9.00 |
| CCP-50CF$_3$ | 8.00 |
| CCP-3F.F | 8.00 |
| CCP-5F.F | 7.00 |
| ECCP-3F.F | 7.00 |
| CCP-3F | 6.00 |
| ECCP-3CF$_3$ | 7.00 |
| BCH-30CF$_3$ | 7.00 |
| PTP-102 | 4.00 |
| PTP-201 | 4.00 |
| CPTP-301 | 2.00 |
| CPTP-302 | 2.00 |
| CPTP-303 | 3.00 |

EXAMPLE 66

| | |
|---|---|
| PCH-3 | 18.00 |
| PCH-5F | 12.00 |

-continued

| | |
|---|---|
| PCH-6F | 12.00 |
| PCH-7F | 10.00 |
| CCP-3F.F | 7.00 |
| CCP-5F.F | 7.00 |
| ECCP-33 | 5.00 |
| CBC-33 | 5.00 |
| CBC-53 | 5.00 |
| CBC-55 | 4.00 |
| CBC-33F | 5.00 |
| CBC-53F | 5.00 |
| CBC-55F | 5.00 |

EXAMPLE 67

| | |
|---|---|
| PCH-3 | 10.00 |
| PCH-5F | 18.00 |
| PCH-6F | 14.00 |
| PCH-7F | 10.00 |
| CCP-3F.F | 9.00 |
| CCP-5F.F | 7.00 |
| CBC-33 | 5.00 |
| CBC-53 | 6.00 |
| CBC-55 | 5.00 |
| CBC-33F | 5.00 |
| CBC-53F | 6.00 |
| CBC-55F | 5.00 |

EXAMPLE 68

Composition:

| | |
|---|---|
| PCH-3 | 10.0% |
| PCH-5F | 18.0% |
| PCH-6F | 14.0% |
| PCH-7F | 10.0% |
| ECCP-3F | 9.0% |
| ECCP-5F | 7.0% |
| CBC-33 | 5.0% |
| CBC-53 | 6.0% |
| CBC-55 | 5.0% |
| CBC-33F | 5.0% |
| CBC-53F | 6.0% |
| CBC-55F | 5.0% |

| | | | |
|---|---|---|---|
| S → N | | | <−20° C. |
| Clearing point | | | +94° C. |
| Viscosity ν | +20° C. | | 16 mm² s⁻¹ |
| Dielectric anisotropy | Δε | 1 kHz, 20° C. | +4.1 |
| | ε∥ | 1 kHz, 20° C. | 7.1 |
| | ε⊥ | 1 kHz, 20° C. | 3.0 |
| Optical anisotropy | Δn | | +0.1006 |
| (20° C., 589 nm) | n_e | | 1.5932 |
| | n_o | | 1.4926 |

EXAMPLE 69

Composition:

| | |
|---|---|
| PCH-3 | 18.0% |
| PCH-5F | 12.0% |

-continued

| | |
|---|---|
| PCH-6F | 12.0% |
| PCH-7F | 10.0% |
| ECCP-3F | 7.0% |
| ECCP-5F | 7.0% |
| ECCP-33 | 5.0% |
| CBC-33 | 5.0% |
| CBC-53 | 5.0% |
| CBC-55 | 4.0% |
| CBC-33F | 5.0% |
| CBC-53F | 5.0% |
| CBC-55F | 5.0% |

| | | | |
|---|---|---|---|
| S → N | | | <−40° C. |
| Clearing point | | | +95° C. |
| Viscosity ν | +20° C. | | 17 mm² s⁻¹ |
| Dielectric anisotropy | Δε | 1 kHz, 20° C. | +5.2 |
| | ε∥ | 1 kHz, 20° C. | 8.4 |
| | ε⊥ | 1 kHz, 20° C. | 3.2 |
| Optical anisotropy | Δn | | +0.1050 |
| (20° C., 589 nm) | n_e | | 1.5981 |
| | n_o | | 1.4931 |

EXAMPLE 70

| | |
|---|---|
| PCH-3 | 7.0% |
| PCH-5F | 12.0% |
| PCH-6F | 12.0% |
| PCH-7F | 10.0% |
| ECCP-3F | 7.0% |
| ECCP-5F | 7.0% |
| PCH-53 | 8.0% |
| ECCP-33 | 5.0% |
| CBC-33 | 5.0% |
| CBC-53 | 6.0% |
| CBC-55 | 5.0% |
| CBC-33F | 5.0% |
| CBC-53F | 6.0% |
| CBC-55F | 5.0% |

| | | | |
|---|---|---|---|
| S → N | | | <−20° C. |
| Clearing point | | | +98° C. |
| Viscosity ν | +20° C. | | 16 mm² s⁻¹ |
| Dielectric anisotropy | Δε | 1 kHz, 20° C. | +3.2 |
| | ε∥ | 1 kHz, 20° C. | 6.0 |
| | ε⊥ | 1 kHz, 20° C. | 2.8 |
| Optical anisotropy | Δn | | +0.1008 |
| (20° C., 589 nm) | n_e | | 1.5942 |
| | n_o | | 1.4934 |

| | Exemples | |
|---|---|---|
| | 71 | 72 |
| S – N [° C.] | <0 | <0 |
| Clearing point [° C.] | +100 | +101 |
| Viscosity [mm²s⁻¹] 20° C. | 16 | 16 |
| Δn (20° C., 589 nm) | +0.086 | +0.086 |
| n_o (20° C., 589 nm) | 1.558 | 1.556 |

-continued

| | Examples | | | |
|---|---|---|---|---|
| | 71 | | 72 | |
| $V_{(10,0,20)}$ | | 2.33 | | 2.38 |
| $V_{(50,0,20)}$ | | 2.86 | | 2.92 |
| $V_{(20,0,20)}$ | | 3.52 | | 3.62 |
| Composition [%]: | EPCH-3OCF3 | 13.0 | EPCH-3OCF3 | 13.0 |
| | PCH-TF | 10.0 | EPCH-5OCF3 | 10.0 |
| | CCP-2OCF3 | 10.0 | CCP-2OCF3 | 10.0 |
| | CCP-3OCF3 | 13.0 | CCP-3OCF3 | 13.0 |
| | CCP-4OCF3 | 7.0 | CCP-4OCF3 | 7.0 |
| | CCP-5OCF3 | 11.0 | CCP-5OCF3 | 11.0 |
| | ECCP-3F.F | 10.0 | ECCP-3F.F | 10.0 |
| | ECCP-3F.F | 4.0 | ECCP-3F.F | 4.0 |
| | ECCP-3F | 11.0 | ECCP-3F | 11.0 |
| | CBC-33F | 3.0 | CBC-33F | 3.0 |
| | CBC-53F | 2.0 | CBC-53F | 2.0 |
| | CBC-55F | 2.0 | CBC-55F | 2.0 |

The liquid crystal mixtures according to the invention can contain, in addition to component B and, where present, A and C, still further additives such as, for example, chiral doping substances, isotropic additives for modifying various parameters, pleochroic dyes and the like. Components A, B and C preferably comprise predominantly the compounds mentioned (that is, more than 50%, in particular more than 60%, of them). However, in a preferred manner, components A, B and C comprise the compounds mentioned (that is, more than 80%, in particular 100% of them).

The invention claimed is:

1. A matrix liquid crystal display comprising:
   two plane parallel support plates which together with a frame form a cell,
   integrated non-linear elements for switching individual picture elements on the support plates and
   a nematic liquid crystal mixture which is present in the cell and has a positive dielectric anisotropy and high resistivity,
wherein the liquid crystal mixture is based on the following components:
   a) at least 10% by weight of a liquid-crystalline component B comprising one or more compounds of the following formulae:

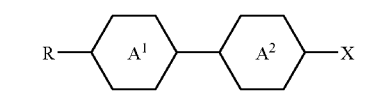

IIa

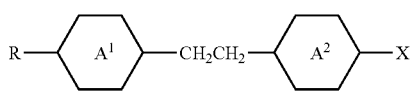

IIb wherein
R is n-alkyl or n-alkenyl of up to 9 carbon atoms,
X is —CF$_3$, —OCF$_3$, or —OCHF$_2$, and
the rings A$^1$ and A$^2$ are each, independently of one another, 1,4-phenylene, 2- or 3-fluoro-1,4-phenylene, 2,3-difluoro-1,4-phenylene, trans-1,4-cyclohexylene or 1,4-cyclohexenylene, and
   b) up to 90% by weight of a liquid-crystalline component A comprising one or more compounds having a dielectric anisotropy of −1.5 to 1.5 of the formula I

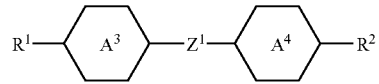

I wherein
R$^1$ and R$^2$ are each, independently of one another, n-alkyl, ω-fluoroalkyl or n-alkenyl having up to 9 carbon atoms,
the rings A$^3$ and A$^4$ are each, independently of one another, 1,4-phenylene, 2- or 3 fluoro-1,4-phenylene, trans-1,4-cyclohexylene or 1,4-cyclohexenylene, and
Z$^1$ is —CH$_2$CH$_2$— or a single bond, and
the nematic liquid crystal mixture has a nematic phase range of at least 60° C., a maximum viscosity at 20° C. of 30 mPa·s and a mean dielectricity constant ε≦8.

2. A display according to claim 1, wherein the liquid crystal mixture comprises one or more compounds each of formulae IIa and IIb.

3. A display according to claim 1, wherein the liquid crystal mixture comprises one or more compounds of formula IIa, wherein

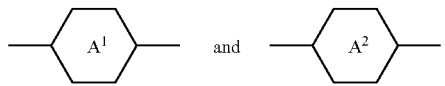

are both selected from trans-1,4-cyclohexylene or 1,4-cyclohexenylene, or one or both of them are selected from 1,4-phenylene, 2- or 3-fluor-1,4-phenylene or 2,3-difluor-1,4-phenylene.

4. A display according to claim 1, wherein the liquid crystal mixture comprises one or more compounds of formula IIa, wherein one of

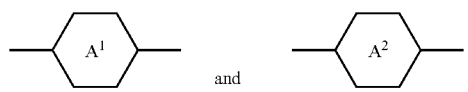

is 1,4-phenylene, 2- or 3-fluor-1,4-phenylene or 2,3-difluor-1,4-phenylene.

5. A display according to claim 1, wherein the liquid crystal mixture comprises one or more compounds of formula IIa, wherein one of

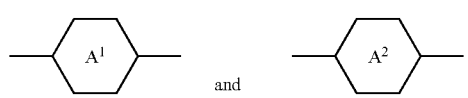

is 2- or 3-fluor-1,4-phenylene.

6. A display according to claim 1, wherein

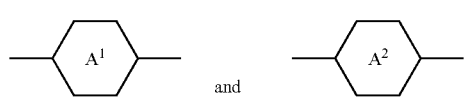

are, independently, trans-1,4-cyclohexylene or 1,4-cyclohexenylene.

7. A display according to claim 1, wherein one or both of

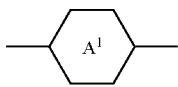 and 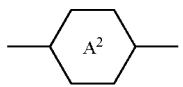

is trans-1,4-cyclohexylene.

8. A display according to claim 1, wherein the liquid crystal mixture comprises one or more compounds of formula IIa wherein X is $OCF_3$ or $CF_3$.

9. A display according to claim 1, wherein the liquid crystal mixture comprises one or more compounds of formula IIa wherein X is $CF_3$.

10. A display according to claim 1, wherein the liquid crystal mixture comprises one or more compounds of formula I, wherein

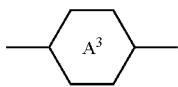 and 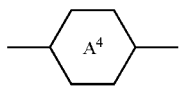

are both trans-1,4-cyclohexylene or 1,4-cyclohexenylene.

11. A display according to claim 1, wherein the liquid crystal mixture comprises one or more compounds of formula I, wherein

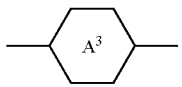 and 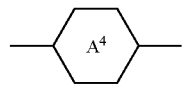

are both trans-1,4-cyclohexylene.

12. A display according to claim 1, wherein the liquid crystal mixture comprises one or more compounds of formula I, wherein $R^1$ and $R^2$ are each, independently, n-alkyl or n-alkenyl.

13. A display according to claim 1, wherein the liquid crystal mixture comprises one or more compounds of formula I, wherein both $R^1$ and $R^2$ are alkyl.

14. A display according to claim 1, wherein the liquid crystal mixture comprises one or more compounds of formula I, wherein one of $R^1$ and $R^2$ is n-alkyl and the other is n-alkenyl.

15. A display according to claim 1, wherein the liquid crystal mixture comprises one or more compounds of formula I, wherein both $R^1$ and $R^2$ are alkenyl.

* * * * *